Figure 1:
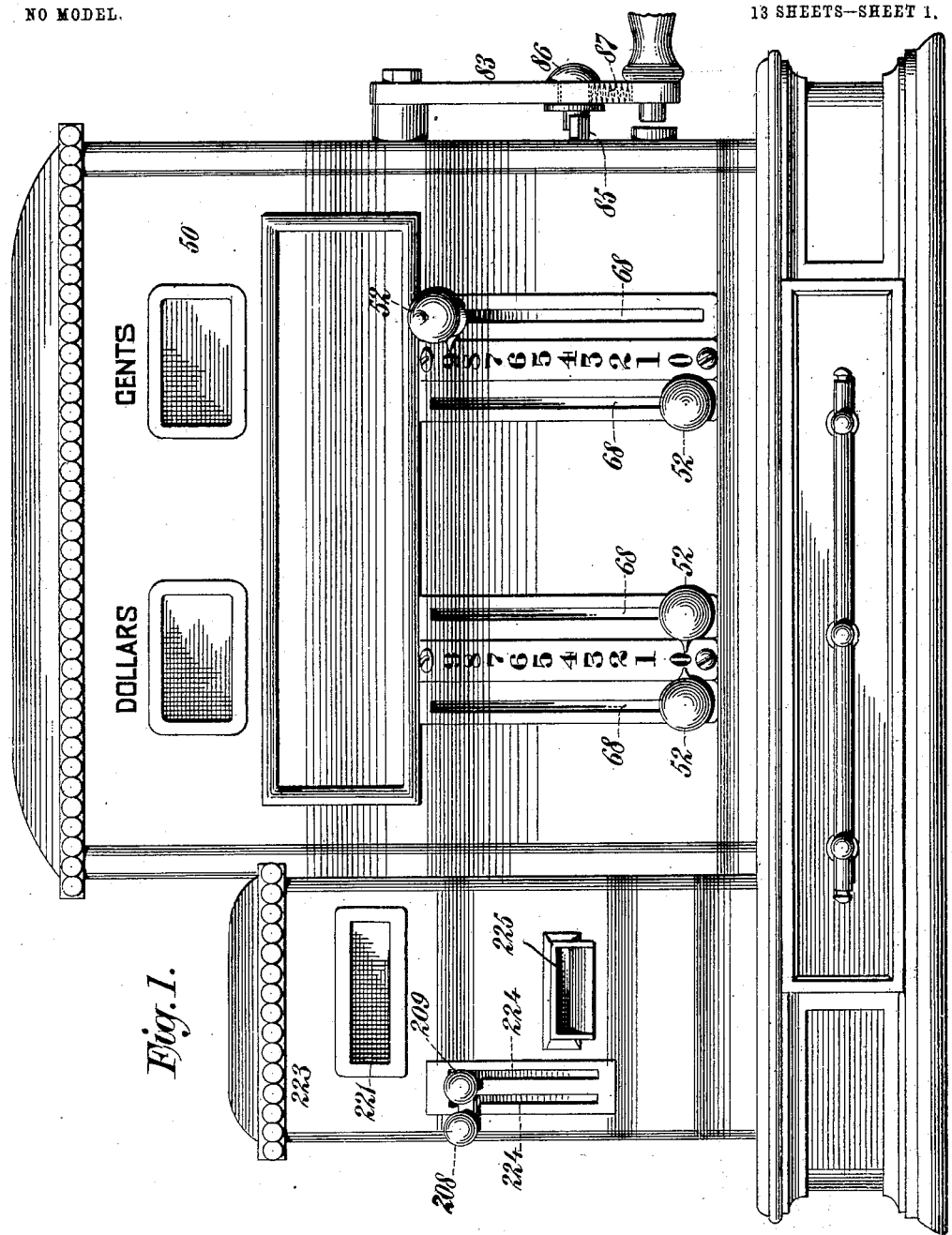

No. 731,448. PATENTED JUNE 23, 1903.
H. GILES.
CASH REGISTER.
APPLICATION FILED NOV. 8, 1902.
NO MODEL. 13 SHEETS—SHEET 1.

WITNESSES:
Gustave Dieterich.
Edwin H. Dieterich.

INVENTOR
Harvey Giles
BY
Chas. C. Gill
ATTORNEY

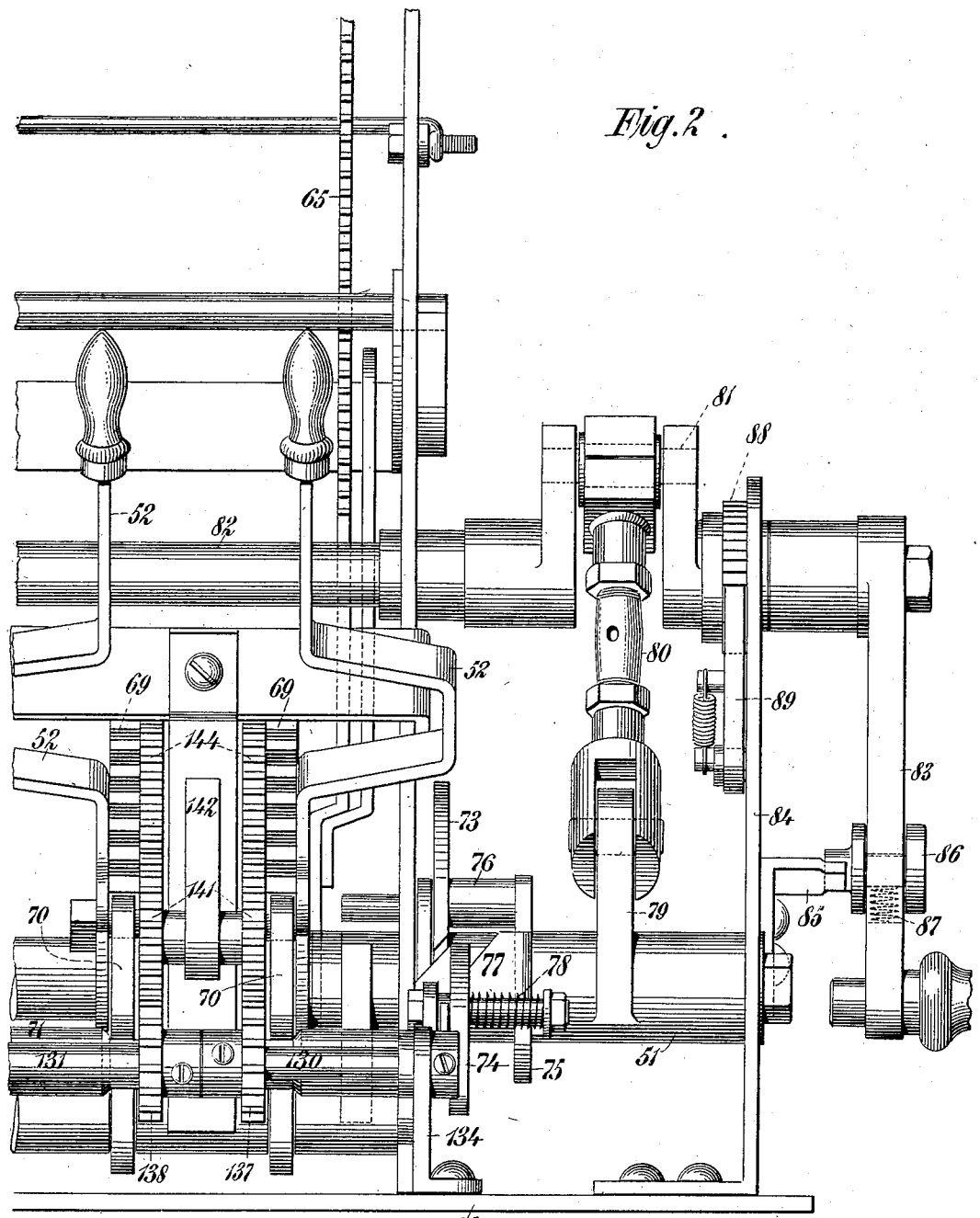

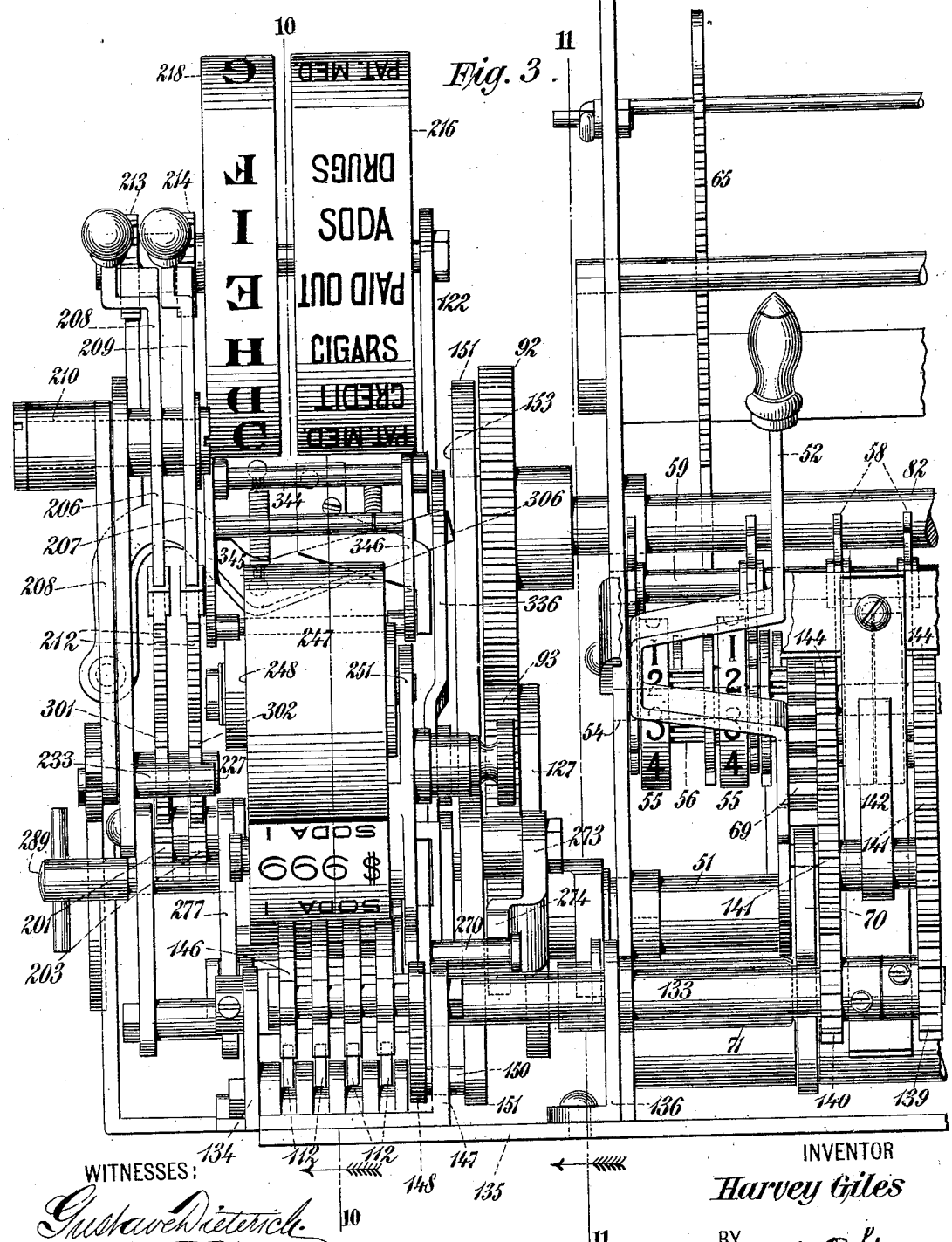

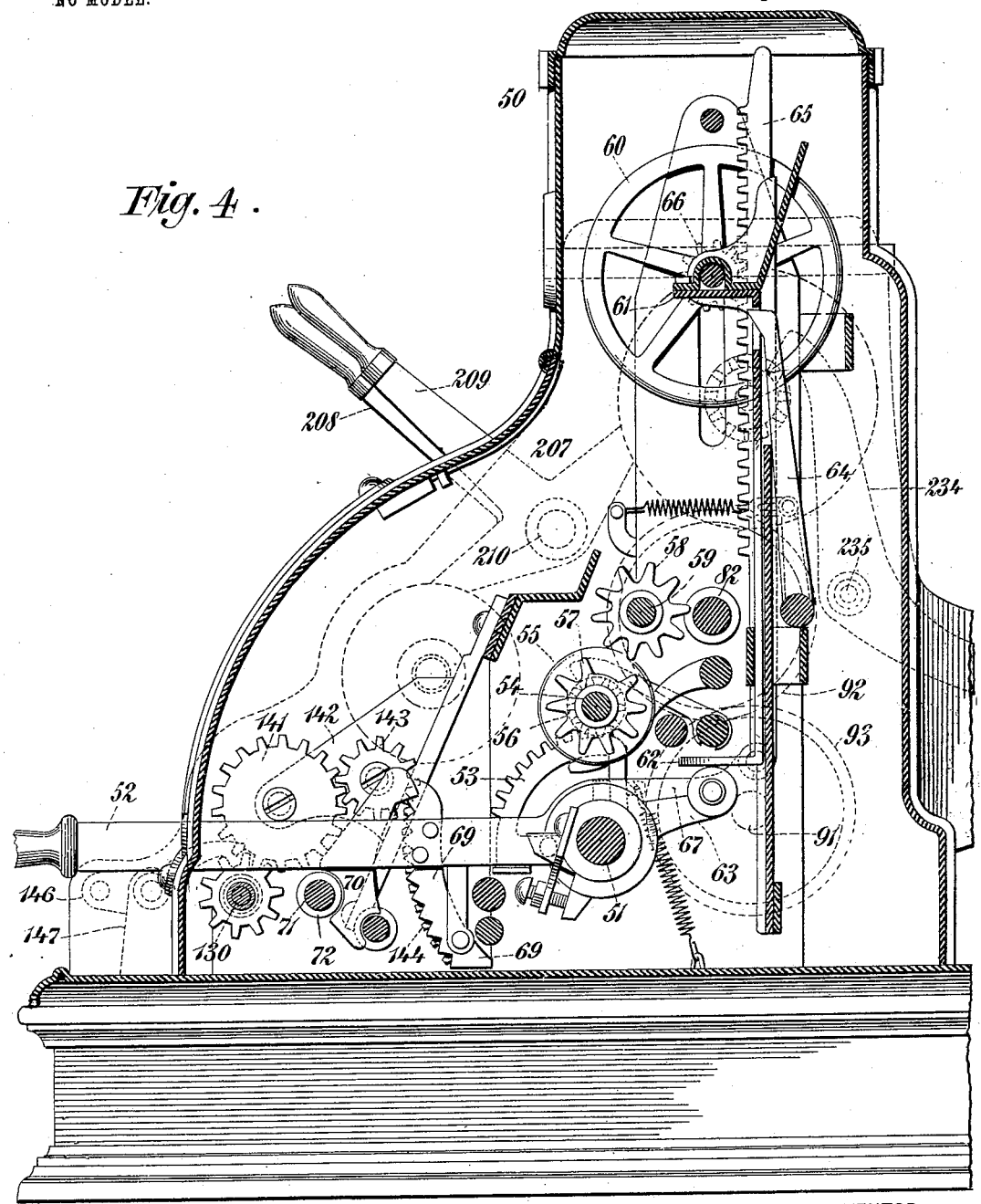

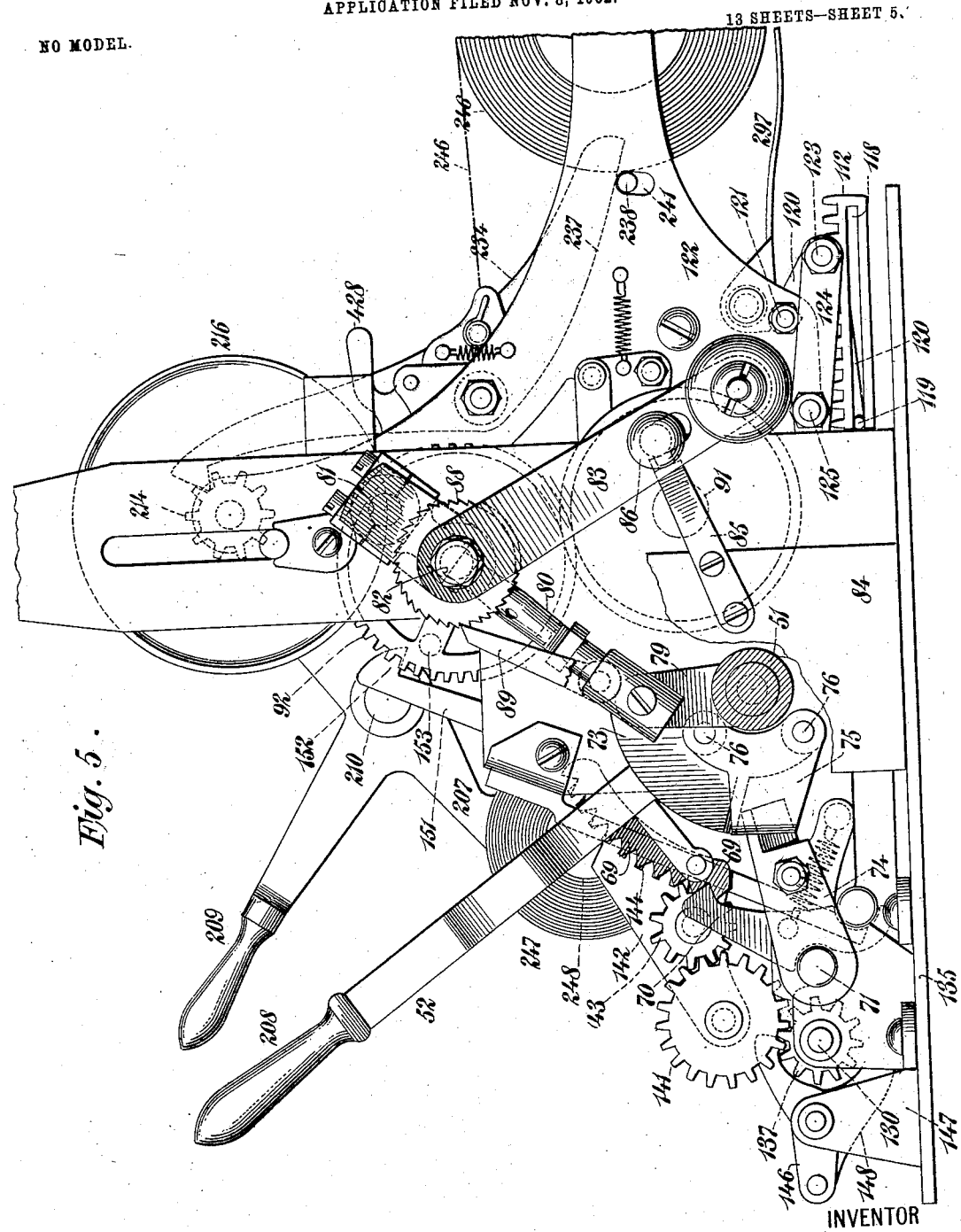

No. 731,448. PATENTED JUNE 23, 1903.
H. GILES.
CASH REGISTER.
APPLICATION FILED NOV. 8, 1902.
NO MODEL. 13 SHEETS—SHEET 6.
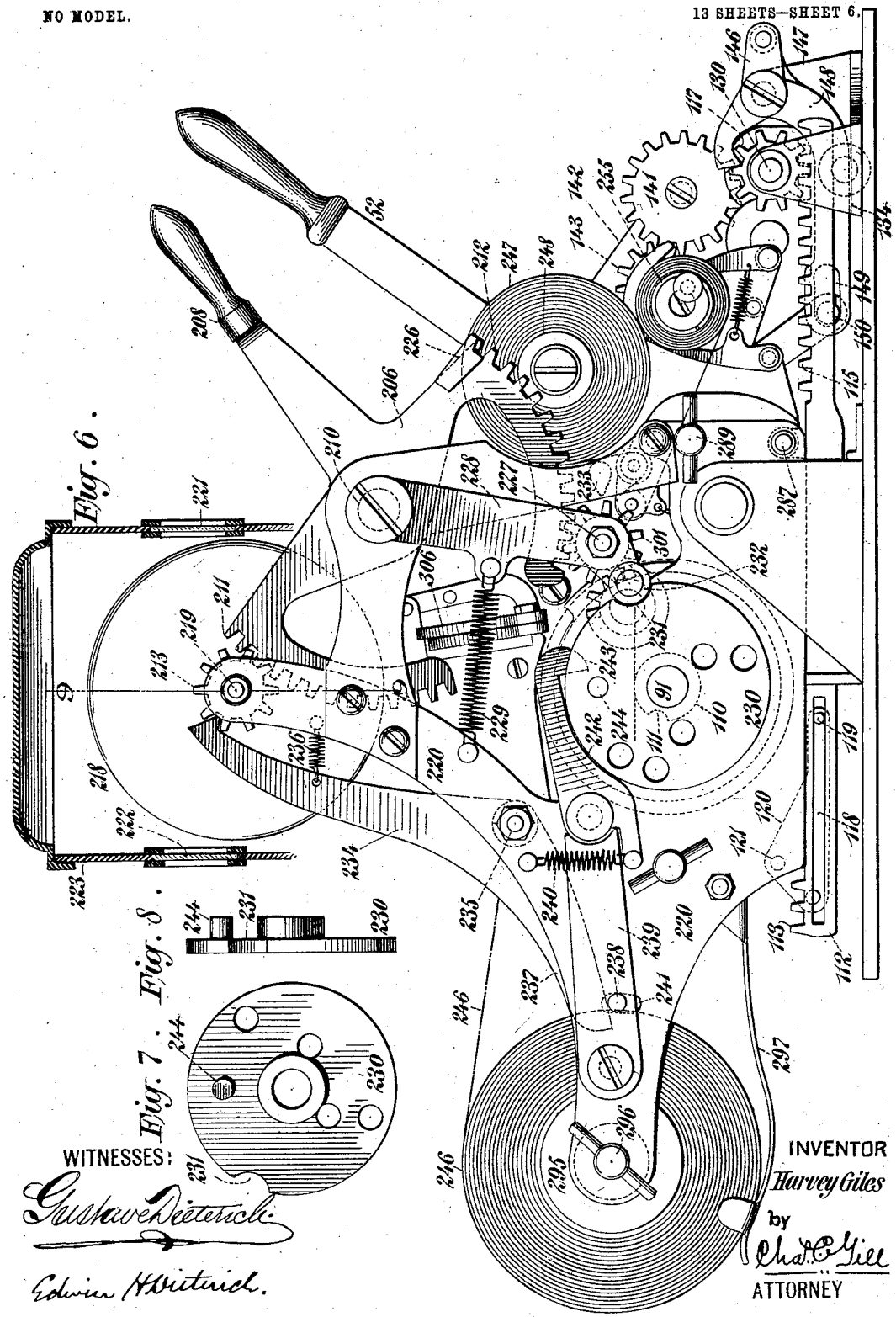
WITNESSES:
Gustave Dieterich
Edwin H Dieterich
INVENTOR
Harvey Giles
by
Chas. C. Gill
ATTORNEY No. 731,448. PATENTED JUNE 23, 1903.
H. GILES.
CASH REGISTER.
APPLICATION FILED NOV. 8, 1902.
NO MODEL. 13 SHEETS—SHEET 7.

WITNESSES:
Gust. Dietrich.
Edwin H. Dietrich.

INVENTOR
Harvey Giles
by Chas. C. Gill ATTORNEY

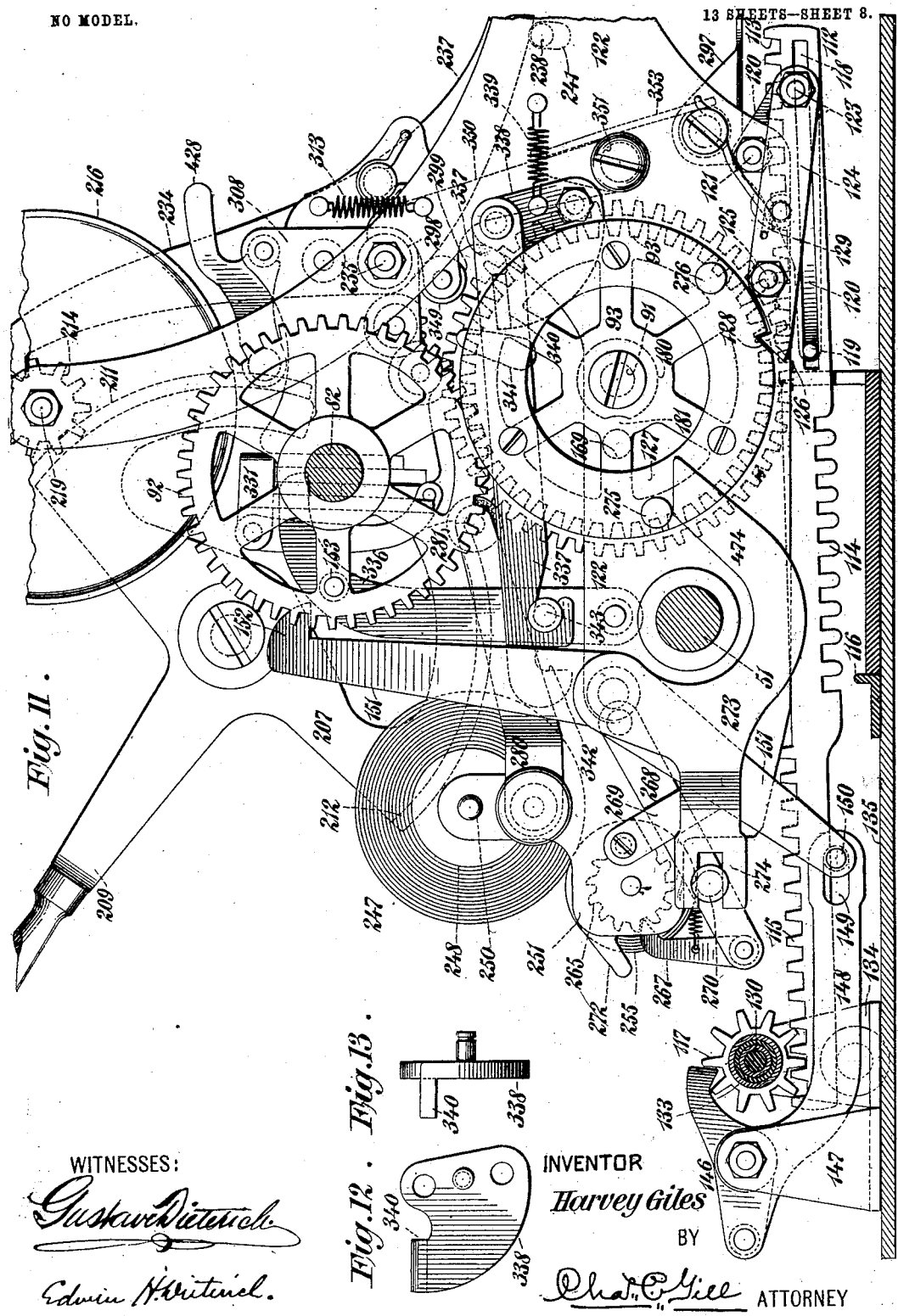

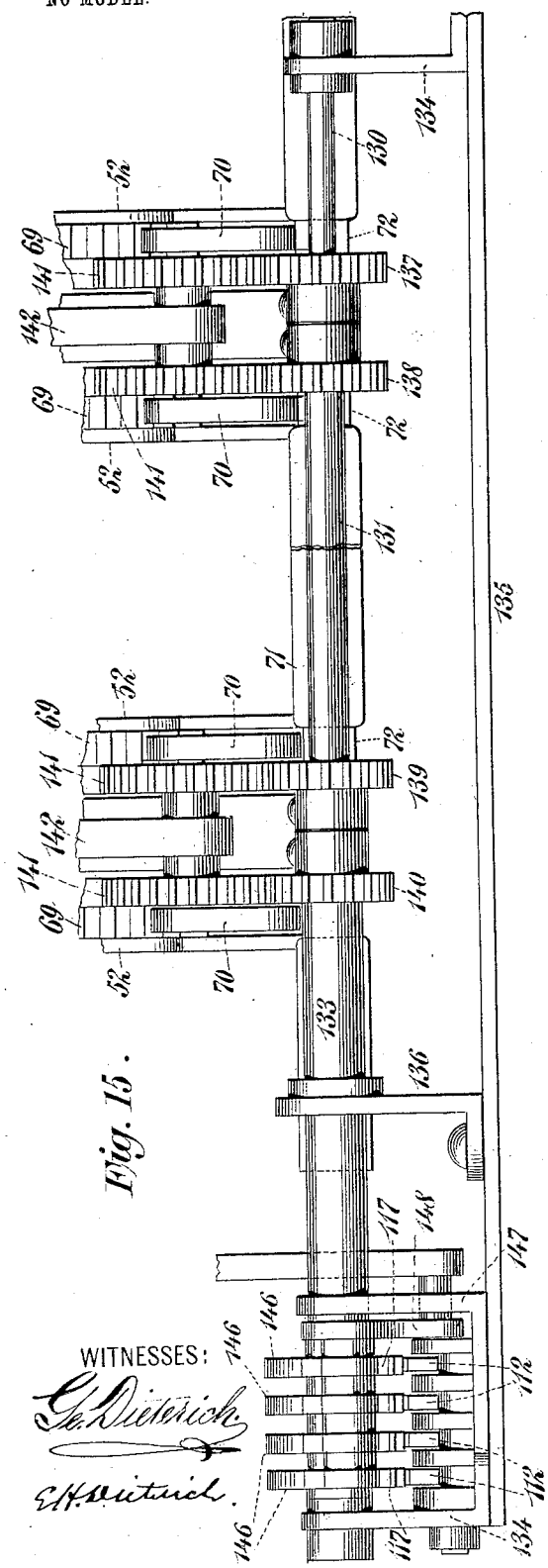

No. 731,448. PATENTED JUNE 23, 1903.
H. GILES.
CASH REGISTER.
APPLICATION FILED NOV. 8, 1902.
NO MODEL. 13 SHEETS—SHEET 11.
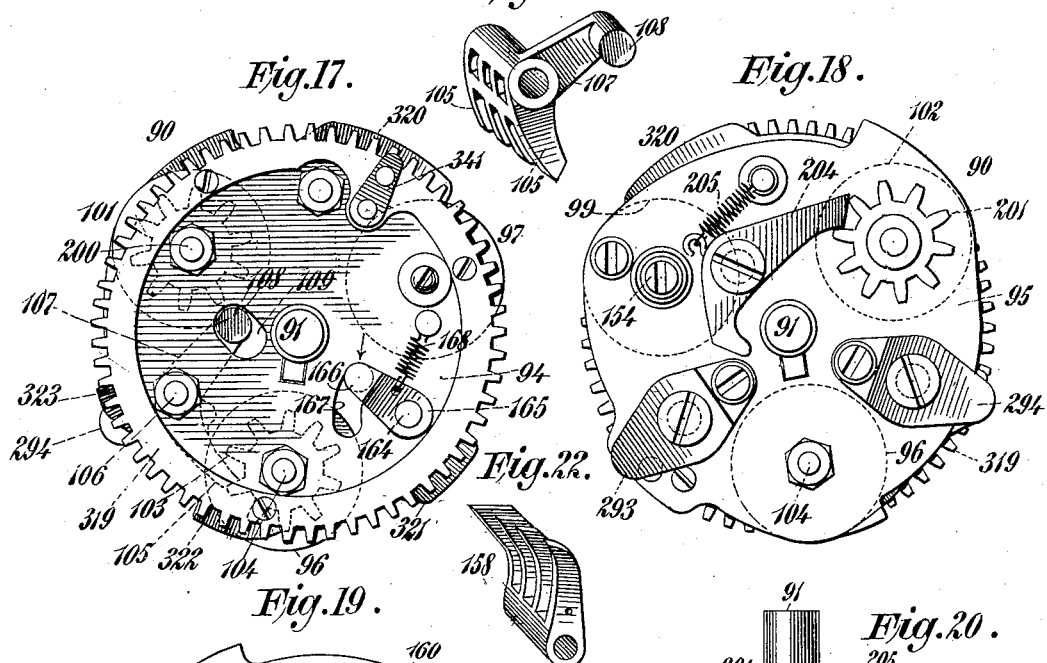
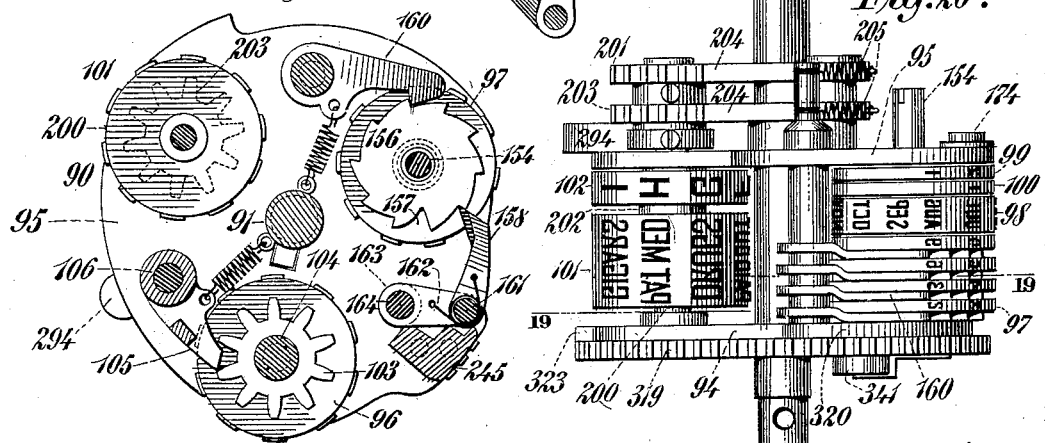
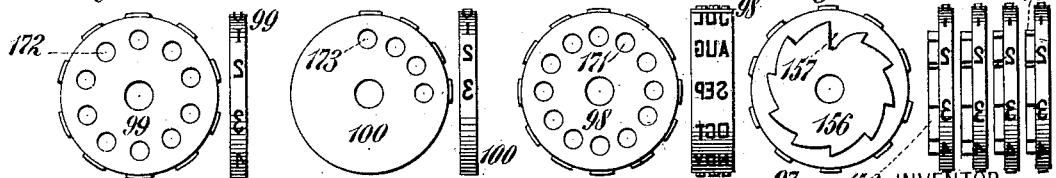
WITNESSES:
Gustave Dieterich
Edwin H. Dieterich
INVENTOR
Harvey Giles
BY
Chas. C. Gill
ATTORNEY No. 731,448. PATENTED JUNE 23, 1903.
H. GILES.
CASH REGISTER.
APPLICATION FILED NOV. 8, 1902.
NO MODEL. 13 SHEETS—SHEET 12.
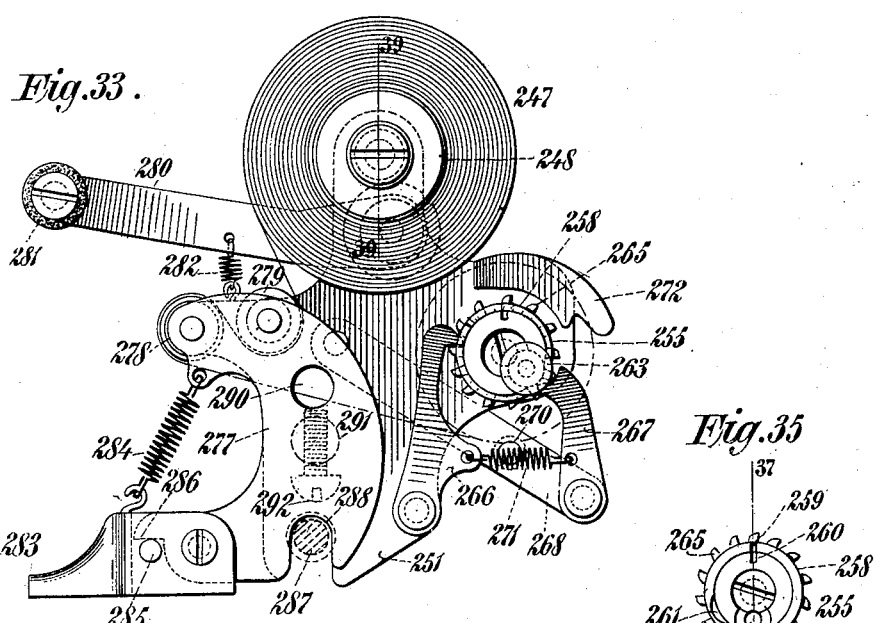
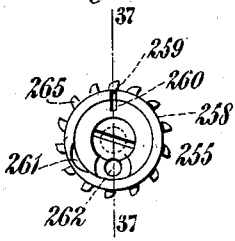
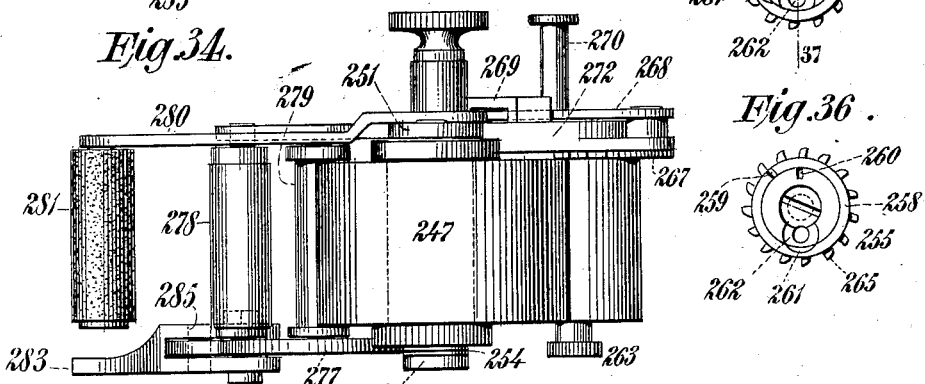
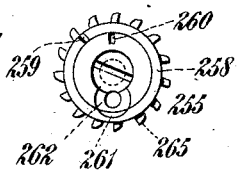
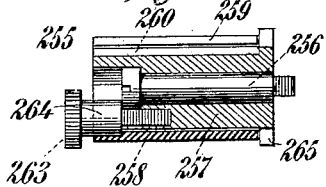
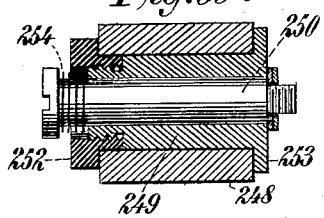
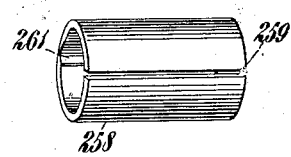
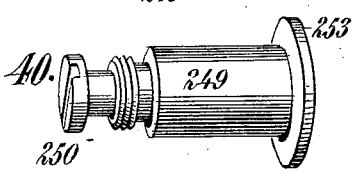
WITNESSES:
Gustave Dieterich
Edwin H. Dieterich
INVENTOR
Harvey Giles
BY
Chas. C. Gill
ATTORNEY No. 731,448. PATENTED JUNE 23, 1903.
H. GILES.
CASH REGISTER.
APPLICATION FILED NOV. 8, 1902.
NO MODEL. 13 SHEETS—SHEET 13.
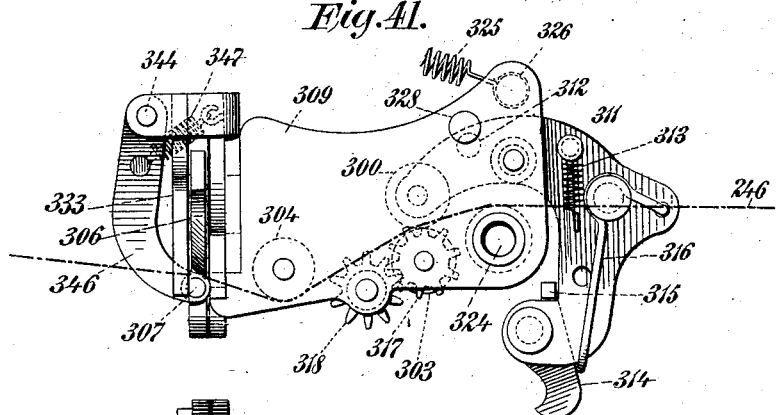
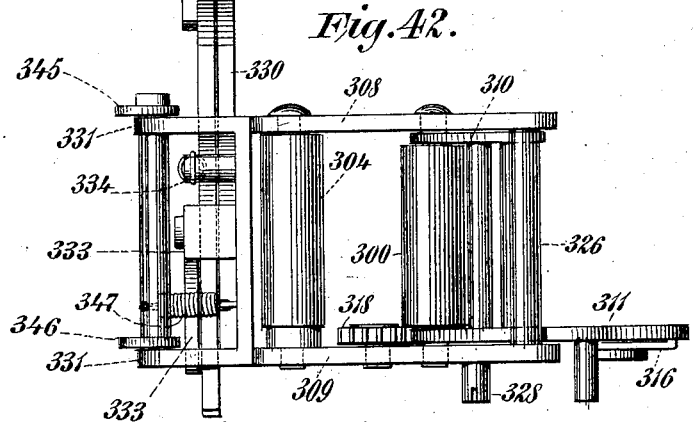
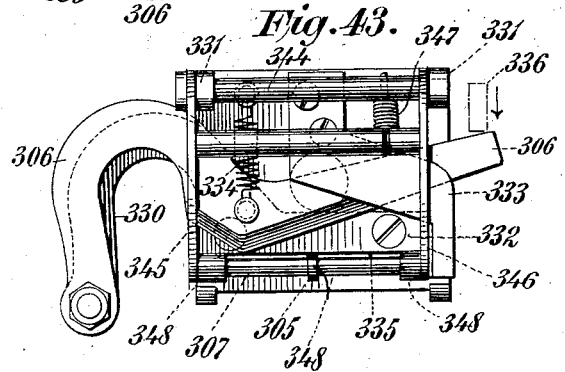
WITNESSES:
Gustave Dieterich.
Edwin H. Dieterich.
INVENTOR
Harvey Giles
BY
Chas. C. Gill
ATTORNEY No. 731,448.

Patented June 23, 1903.

UNITED STATES PATENT OFFICE.

HARVEY GILES, OF SOUTH BOUNDBROOK, NEW JERSEY, ASSIGNOR TO IDEAL CASH REGISTER COMPANY, OF NEW BOUNDBROOK, NEW JERSEY, A CORPORATION OF NEW JERSEY.

CASH-REGISTER.

SPECIFICATION forming part of Letters Patent No. 731,448, dated June 23, 1903.

Application filed November 8, 1902. Serial No. 130,518. (No model.)

*To all whom it may concern:*

Be it known that I, HARVEY GILES, a citizen of the United States, and a resident of South Boundbrook, in the county of Somerset and State of New Jersey, have invented certain new and useful Improvements in Cash-Registers, of which the following is a specification.

The invention relates to improvements in cash-registers; and it consists in the novel features, structure, and combinations of parts hereinafter described, and particularly pointed out in the claims.

The present invention has reference more particularly to improvements in the character of cash-registers made the subject of Letters Patent of the United States Nos. 640,825 and 640,966, granted January 9, 1900, to E. F. Spaulding, No. 677,896, granted July 9, 1901, to Smith and Giles, and No. 690,472, granted January 7, 1902, to Smith and Giles. In the operation of the registers shown in the said patents the operator moves the exposed actuating or setting levers along lines of numerals provided upon the front face of the register-casing to set certain interior segments into proper operative relation to the pinions connected with the registering-wheels, and thereafter the operator by moving an exposed crank or handle places the said pinions into direct engagement with the said segments and effects the movement of the said segments to their normal position, whereby said segments are caused to operate the registering-wheels to the extent desired and governed by the position given to the said segments by the said actuating or setting levers.

The purpose of the present invention is more especially to provide the cash-registers of the character above referred to with means connected with and operable simultaneously with the register mechanism for printing and delivering a check bearing the desired data and for printing upon a tape, known as a "detail-strip," the amounts registered and other desired data.

In accordance with my present invention I shall prefer to print upon the check to be delivered from the machine a word denoting the department, such as the word "soda," from which the sale has been made, the initial of the salesman making the sale and operating the register, the amount of the sale, an advertisement, such as the name and address of the store using the register, the consecutive number of the check, and the date of the sale, while upon the detail-strip remaining in the machine I shall print a word denoting the department from which the sale is made, the initial of the salesman, and the amount of the sale.

The invention and satisfactory means for carrying the same into effect will be fully understood from the detailed description hereinafter presented, reference being had to the accompanying drawings, in which—

Figures 9, 10:
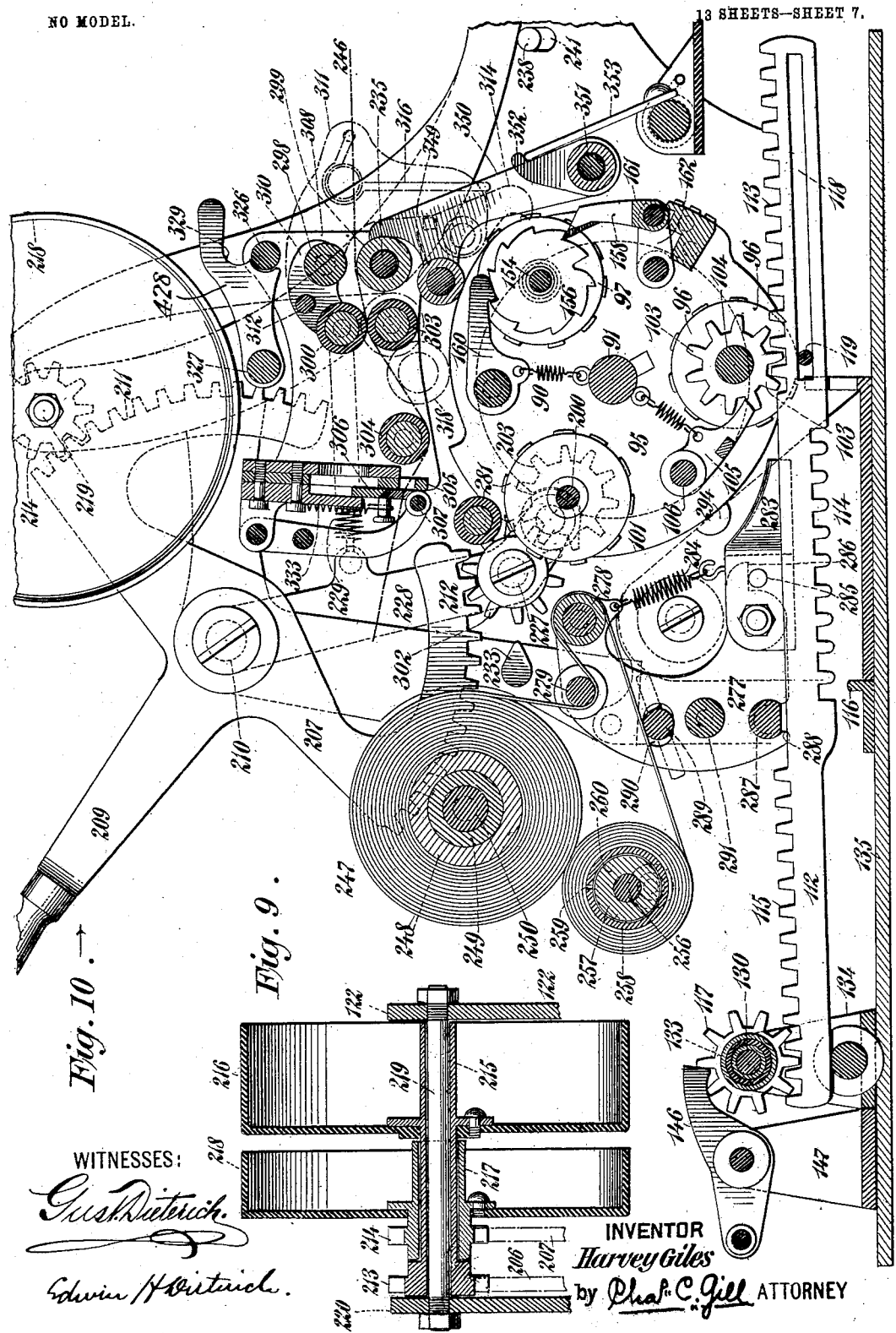
Figure 14:
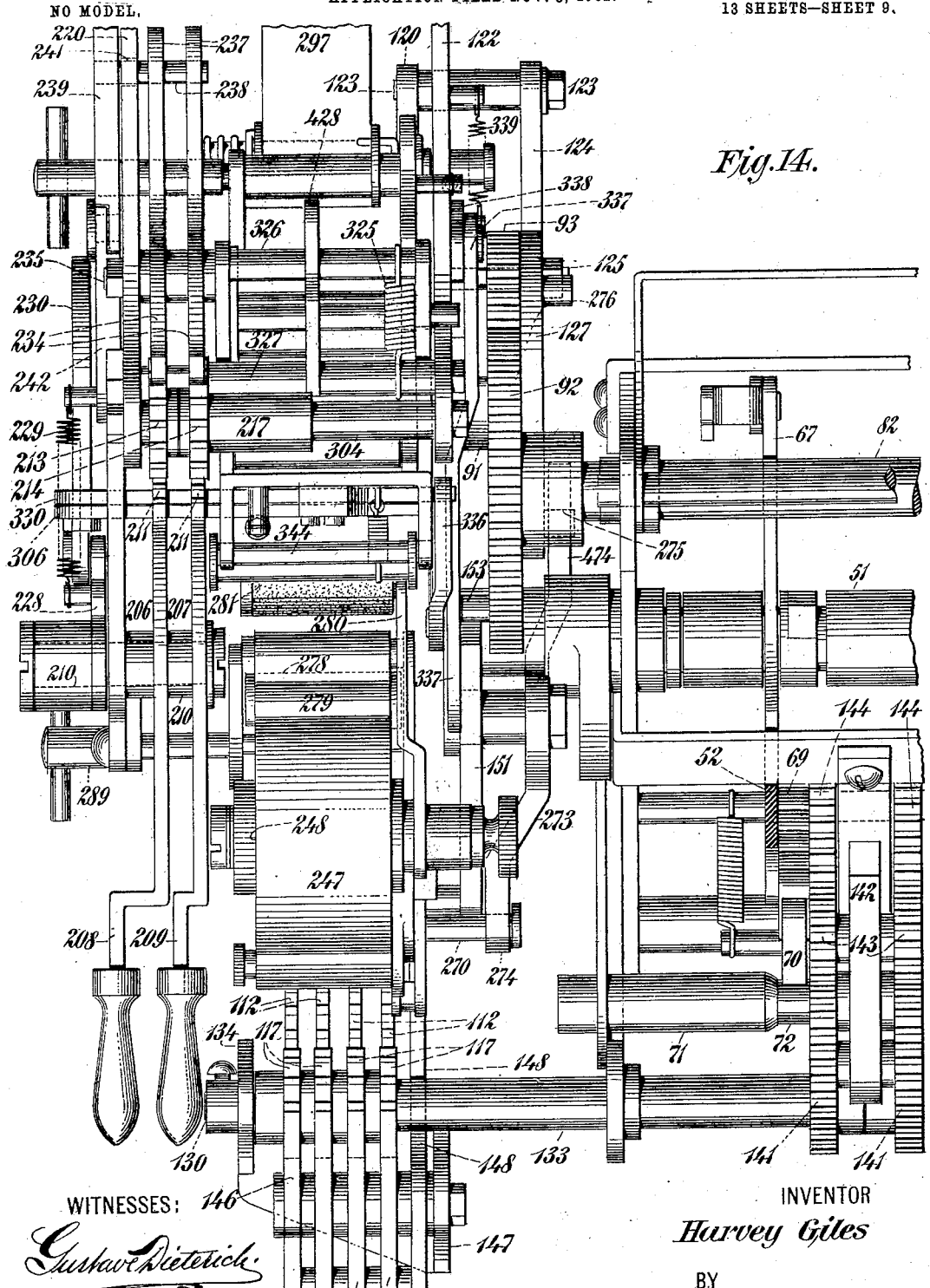

Figure 1 is a front elevation of a cash-register constructed in accordance with and embodying the invention, a portion of the crank-handle being broken away. Fig. 2 is a front elevation, partly broken away, of the right-hand portion of the interior mechanism of the register, the casing and the cash-drawer being omitted. Fig. 3 is a like view of the left-hand portion of same. Fig. 4 is a central vertical longitudinal section through the cash-register. Fig. 5 is an end elevation, partly broken away, of the interior mechanism of the register, the casing and cash-drawer being omitted and the view being taken from the right-hand end of said mechanism. Fig. 6 is an end elevation, looking at the left-hand end of the register, of the interior mechanism of the latter, a portion of the register-casing being indicated in section and the cash-drawer being omitted, and this view showing more particularly the check and detail strip actuating and printing mechanism with the parts connected therewith. Fig. 7 is a detached side elevation of a cam-wheel, forming one of the operative details to be hereinafter described. Fig. 8 is an edge view of same. Fig. 9 is an enlarged detached sectional view on the dotted line 9 9 of Fig. 6 of the cylinders for indicating to the customer the department from which the sale is made and the initial of the salesman, the printing on these cylinders being observable through glass windows from both the front and rear of that portion of the register-casing inclosing said cylinders. Fig. 10 is a vertical longitudinal section on the dotted line 10 10 of Fig. 3 through the left-hand portion of the interior mechanism of the register, this section being through that part of the register embracing more particularly the check and detail strip printing and actuating mechanism. Fig. 11 is a like section of same on the dotted line 11 11 of Fig. 3. Fig. 12 is a detached side elevation of a cam-plate, forming one of the operative details of the machine to be hereinafter described. Fig. 13 is an edge view of same. Fig. 14 is a top view, partly broken away, of the left-hand portion of the interior mechanism of the register, the register-casing being omitted and the mechanism shown having to do more particularly with the check and detail printing and actuating features. Fig. 15 is a detached front elevation, partly broken away, of a portion of the mechanism of the register, this mechanism having to do more particularly with the transmission of motion from the hand actuating or setting levers to the sliding rack-bars by which the printing-wheels carried by the rotary printing-frame are moved to correspond with the movement of said levers. Fig. 16 is a central vertical longitudinal section through the power-transmitting means shown in front elevation in Fig. 15. Fig. 17 is a detached side elevation of the rotary printing-frame, taken from the right-hand side thereof. Fig. 18 is a side elevation of the said rotary printing-frame, taken from the left-hand side thereof. Fig. 19 is a vertical section through said printing-frame on the dotted line 19 19 of Fig. 20. Fig. 20 is a top view of the rotary printing-frame. Fig. 21 is a detached perspective view of the pawls for engaging the pinions connected with the amount-printing wheels carried by the rotary printing-frame. Fig. 22 is a perspective view of the pawls for actuating the consecutive-numbering printing-wheels carried by the rotary printing-frame. Fig. 23 is a detached side elevation of one of the date-printing wheels carried by the rotary printing-frame, this wheel bearing on its periphery numbers ranging in order from "0" to "9," inclusive. Fig. 24 is an edge view of same. Fig. 25 is a detached side elevation of another one of the date-printing wheels carried by the rotary printing-frame, this wheel bearing on its periphery numerals ranging in order from "0" to "3," inclusive, the "3" on this wheel with, for illustration, the "1" on the wheel shown in Fig. 23 denoting the thirty-first day of the month. Fig. 26 is an edge view of same. Fig. 27 is a detached side elevation of the month-denoting date-wheel carried by the rotary printing-frame. Fig. 28 is an edge view of same. Fig. 29 is a detached side elevation of one of the consecutive-numbering wheels with the ratchet-plate thereon, this figure representing either of the three lowest consecutive-numbering wheels, the ratchet-plate of each of which contains one deep notch, as shown in Fig. 29, in addition to the usual notches. Fig. 30 is a detached top view of the four consecutive-numbering wheels, each bearing on its periphery numbers ranging from "0" to "9," inclusive. Fig. 31 is a detached side elevation of one of the consecutive-numbering wheels, this view being taken from that side of the wheel opposite to the one shown in Fig. 29 and showing in section a portion of the shaft upon which the said wheels rotate. Fig. 32 is a vertical section of same with a portion of the shaft shown in position. Fig. 33 is a detached side elevation, looking at the left-hand side thereof, of the detail-strip-supporting frame and feeding mechanism. Fig. 34 is a top view of same. Fig. 35 is a detached end view of the roller and its parts for engaging the end of the detail-strip for winding said strip from the reel, the elements shown in Fig. 35 being presented in the position they are given when the extreme edge of the strip is first applied to them and before said parts are locked together so as to bind said edge. Fig. 36 is a like view of same, but illustrating said parts in the position given to them when they are locked together to firmly bind or grip the end edge of the detail-strip. Fig. 37 is a sectional view of same on the dotted line 37 37 of Fig. 35 and showing in position the hand-operated screw for locking the parts together. Fig. 38 is a detached perspective view of one portion of the roll for winding upon itself the detail-strip from the reel. Fig. 39 is a vertical section, on the dotted line 39 39 of Fig. 33, of the reel for the detail-strip, this reel being provided with means for preventing the loosening up of the coils of paper thereon. Fig. 40 is a detached perspective view of a portion of same. Fig. 41 is a detached side elevation, looking at the right-hand side of same, of the means for feeding the check-strip and severing the checks from the same. Fig. 42 is a top view of same. Fig. 43 is a front elevation of same.

In the drawings, 50 denotes the general exterior casing of the register; 51, the operating-shaft for the register mechanism; 52, the hand actuating or setting levers; 53, Fig. 4, the usual segments adapted to follow said levers 52 and to be set into predetermined positions thereby; 54, the registering-wheel shaft, which is vertically movable; 55, the registering-wheels loosely mounted upon said shaft, so as to be rotated thereon; 56, the usual pinion-wheels connected with said registering-wheels to be engaged and actuated by said segments 53 for rotating the registering-wheels to effect registration; 57, gear-wheels connected with said registering-wheels to be engaged by the gear-wheels 58 when the registering-wheel shaft 54 is in its upper position; 59, a shaft upon which the gear-wheels 58 are rigidly secured and which is utilized in connection with the gear-wheels 58 and gear-wheels 57 for setting the registering-wheels 55 back to their "0" position when desired; 60, the usual indicating cylinders or drums for indicating to the customer the amount of the sales; 61, a vertically-movable frame carrying said cylinders 60 and having at its lower end a forwardly-projecting foot 62, Fig. 4; 63, an arm connected with the operating-shaft 51 for moving the frame 61 and cylinders 60 to their upper exposure position when the shaft 51 is turned frontwardly; 64, a pawl for engaging the frame 61 and supporting it in its upper position; 65, vertically-movable rack-bars to engage pinions 66, carried by the indicating-cylinders 60, for rotating said cylinders 60, and 67 rearwardly-extending arms connected with the hand-setting levers 52 and pivotally connected at their rear end with the lower ends of the rack-bars 65, so that when the levers 52 are moved they may actuate said rack-bar 65 and correspondingly rotate the said cylinders 60, all of the features thus specifically designated being well known in this art, having been disclosed in the aforesaid Letters Patent, and therefore requiring no special explanation.

The hand actuating or setting levers 52 extend frontwardly through slots 68, Fig. 1, formed in the register-casing 50, and upon the front of said casing are provided columns of numerals ranging from "0" to "9," inclusive, to guide the operator when moving said levers 52 to their necessary predetermined positions in accordance with the amounts of the sales, and the hand setting-levers 52 after having been moved to their predetermined positions along the slots 68 are locked against movement during all such time as the main operating-shaft 51 is performing its movement toward the front to restore the segments 53 to their "0" position and then back to its normal position, and the means for locking the levers 52 comprise the rigidly-secured serrated segments 69, carried by said levers 52, the pivotally-mounted dogs 70 at their upper ends engaging said segments 69, and a slidable shaft 71, containing in line with said dogs 70 grooves 72, which during the setting of the levers 52 will allow said dogs to have a sufficient vibratory movement to allow the segment 69 to pass over them, said dogs at such time merely placing the levers 52 under a yielding restraint sufficient to hold them in any set position to which they may be moved. When the shaft 51 is set in motion, which is after the levers 52 are given their predetermined positions, a cam-plate 73, Figs. 2 and 5, secured on the shaft 51, will be carried downward against the inner or rear end of a plate 74, secured on the end of the said shaft 71, and slide said shaft 71 outwardly toward the right, thereby causing the grooves 72 of said shaft 71 to pass from alinement with the dogs 70 and carrying solid portions of said shaft 71 against the adjoining curved surfaces of said dogs 70, the said dogs 70 being thereby prevented from having any vibratory movement and being held stationary against the segments 69, with the result of locking the levers 52 against movement in either direction. The plate 73 on the shaft 51 will ride against the inner end of the plate 74 on the shaft 71 during the entire movement of the operating-shaft 51, and thus the levers 52 will remain in their locked condition during substantially all of the movement of the shaft 51 from its initial position and back to its initial position. When the shaft 51 is moving upwardly and rearwardly toward its normal position, a plate 75, carried (by means of pins 76) by the cam-plate 73, will ride upwardly against the right-hand side of the inner end of the plate 74 and force said plate 74 and the shaft 71 toward the left to their normal initial position, thereby restoring the grooves 72 of the shaft 71 into alinement with the dogs 70, thus freeing said dogs 70 and the levers 52 from their locked condition. As may be seen in Fig. 2, the plate 75 has an inwardly-extending toe 77 to engage the plate 74 during the upward movement of said plate 75. The coiled spring 78, Fig. 2, also aids in restoring the plate 74 and grooved shaft 71 to their normal position. (Shown in Fig. 2.) The segments 69, locking-dogs 70, and grooved sliding shaft 71 are illustrated in the aforesaid Letters Patent No. 690,472, dated January 7, 1902, and therefore require no further description herein.

In the patents hereinbefore designated the operating-shaft 51 is shown as provided with an exposed crank-handle by which movement was imparted to said shaft, said crank-handle normally extending upwardly and being adapted to be moved frontwardly and downwardly to about a horizontal position for causing the shaft 51 to perform about one-fourth of a rotation, said exposed crank-handle being then pushed upwardly to its normal position, reversing the movement of the shaft 51. In the present construction the crank for imparting the usual movement to the operating-shaft 51 in the register-casing I designate in Figs. 2 and 5 by the numeral 79, and this operating-crank 79 is connected by a pitman-rod 80 with a crank-pin 81, carried by a shaft 82, upon whose outer right-hand end is provided a crank-handle 83 to be used by the operator in effecting registration, indication, and printing on the detail and check strips and the severing of the checks. The crank-handle 83 and shaft 82 will at each operation perform a full rotation, but will through the rod 80 only impart a frontwardly and downwardly movement to the crank 79 and shaft 51 and then an upwardly and rearwardly movement to said crank and shaft while restoring the latter to their normal position, said crank 79 and shaft 51 having imparted to them about one-fourth of a rotation from their normal position and then back to their normal position. It is thought that in some instances it is better that the exposed crank for operating the shaft 51 shall perform a complete rotation, and the purpose of providing the exposed crank-handle 83 and inner crank 79 is to enable the operator to impart the usual movement or partial rotation to the shaft 51 by means of the crank-handle, which may perform a full rotation. Upon the interior end frame 84 is provided a stop 85, Fig. 2, for arresting the crank-handle 83 at its normal initial position, and upon the crank-handle 83 is provided a sliding stop 86, held by a spring 87, set within the crank-handle 83 in a position to contact at its inner end with the stop 85. When the operator desires to move the crank-handle 83, he will press the stop 86 downward against the stress of the spring 87 until the inner end of said stop passes below and becomes free of the stop 85, and thereupon the operator will draw the said crank-handle 83 toward the front and move it to perform a full rotation, loosening from his grasp the stop 86, so that upon the end of such rotation the said stop will contact with the stop 85 and arrest said handle 83. Upon the shaft 82, adjacent to the inner supporting side frame 84, is provided a ratchet-wheel 88 to be engaged by a spring-pressed pawl 89, Figs. 2 and 5, pivotally secured to the said frame 84, the purpose of the ratchet 88 and pawl 89 being to prevent the exposed crank-handle 83 from being rotated except in a proper direction and to compel said handle 83 when once started to perform its movement to be given a complete rotation back to its normal position. Although the exposed crank-handle 83 in the present instance is given a complete rotation with every operation of the register, the operating-crank 79 and shaft 51 have imparted to them only the motion described in the aforesaid Letters Patent for the operating-shaft and exposed crank-handle.

In the present construction I utilize the movement of the shaft 82 for effecting the printing on the detail and check strips, and I utilize the movement of the hand actuating or setting levers 52 for setting certain type-wheels carried by the printing-frame in accordance with the amounts of the sales denoted by the positions given to the said levers 52 in the usual operation of the machine preparatory to registration and indication being effected from the crank-handle 83, the latter being employed not only to effect the registration and indication, but also through the shaft 82 to secure the printing by means of the printing-frame hereinafter described upon the check and detail strips.

The printing-frame (numbered 90) as a whole is shown in detail in Figs. 17 to 32, inclusive, and is mounted upon a shaft 91, which has its bearings in stationary parts of the framing of the machine and receives its rotary motion from the driving-shaft 82, hereinbefore referred to, through a gear-wheel 92, Figs. 3, 11, and 14, carried on the left-hand end of said shaft 82, and a gear-wheel 93, secured upon the right-hand end of the shaft 91 and in constant mesh with the said gear-wheel 92. With every full movement of the operating crank-handle 83 the shaft 82 and gear-wheels 92 93 will perform a complete rotation and impart a full rotation to the printing-frame 90.

The printing-frame 90 comprises two connected side plates 94 95, between which are mounted on shafts the series of type-wheels 96 for printing the amount of the sales, the consecutive-numbering type-wheels 97 for printing the serial number of the sales registered, the dating-wheels, comprising the month-wheel 98 and numbered wheels 99 100, for printing the day of the month, the department-printing wheel 101, and the initial-printing wheel 102, the characters on the wheel 101 being to indicate the department or departments from which the sales have been made and the initial-wheel 102 being provided to indicate the initial of the salesmen making the sales. The amount-wheels 96 are of usual character and preferably four in number, each on its periphery being numbered from "0" to "9," inclusive, and each being in rigid connection with a gear-wheel 103, through which motion may be imparted to the amount-wheels 96, each wheel 96 being capable of independent movement upon the shaft 104. Each gear-wheel 103 will be provided with a spring-pressed dog 105, which will permit the gear-wheel to turn in either direction, but which will restrain said gear-wheel against looseness of movement or undue momentum. The printing-frame 90 is shown in its normal initial at-rest position in Figs. 17 and 19, and it is when said frame is in this position that the amount-wheels 96 are rotated and thereby set in accordance with the amount of the sale to be registered and printed upon the check and detail strips. The amount-wheels 96 are moved to bring the proper numbers on their peripheries into line to print the amount of a sale by intermediate mechanism actuated by the hand setting-levers 52, the movement of said levers 52 operating to set the interior segments 53 for the registering wheels 55 and also through the mechanism to be hereinafter described to set the amount-printing wheels 96 preparatory to the rotation of the printing-frame 90 from the driving-shaft 82. The pawls 105 for the gear-wheels 103, connected with the amount-printing wheels 96, are all in one integral casting, as shown in Fig. 21, this casting or pawl-frame being mounted upon a pin 106 and having an arm 107, carrying the stud 108, projecting laterally through an elongated slot 109, formed in the plate 94 of the printing-frame 90, as shown in Fig. 17. The stud 108 is provided to coöperate with a hub 110 (shown by dotted lines in Fig. 6) on the frame 220 and having at one point a recess 111, which when the printing-frame 90 is in its initial position will be directly opposite to the stud 108 and allow the pawl-arm 107 to have a free vibratory motion under any movement that may be imparted to the gear-wheels 103, the purpose being that when the frame 90 is in its initial position the wheels 103 shall be free to rotate in either direction. After the gear-wheels 103 have been turned to set the amount-wheels 96 the frame 90 is given a rotation, and during this rotation of the frame 90 the stud 108 of the pawl-arm 107 will ride on the concentric periphery of the hub 110, and thereby lock the pawls 105 against movement, this locking of the pawls 105 being to maintain the gear-wheels 103 and amount-wheels 96 in locked condition during the entire rotation of the printing-frame 90. When the printing-frame 90 has again reached its initial position, the stud 108 will come to rest when directly opposite the recess 111 of the hub 110, and hence at such time the pawls 105 will be free to vibrate, and the gear-wheels 103 may be again moved to set the amount-printing wheels 96.

Prior to describing the details of the consecutive-numbering, dating, department, and initial wheels carried by the printing-frame 90 I will explain the mechanism intermediate the hand setting-levers 52 and gear-wheels 103 of the amount-printing wheels 96, so that the method of setting the wheels 96 when the frame 90 is in its initial position may be fully understood, the said wheels 96 being set independently of all of the other wheels carried by the said frame 90.

The mechanism for directly engaging the gear-wheels 103 of the amount-printing wheels 96 for rotating said wheels comprise, when four printing-wheels 96 are employed, four sliding rack-bars 112, these rack-bars 112 being disposed at right angles to the shaft 91 of the printing-frame 90, and there being one independent rack-bar 112 for each of the printing-wheels 96. The rack-bars 112 are in mesh with the gear-wheels 103 of the printing-wheels 96 when the operating crank-handle 83 is in its normal at-rest position, so that upon the movement of any of the hand setting-levers 52 the proper amount-printing wheels 96 may be rotated by means of the rack-bars 112; but, as hereinafter described, when the operating crank-handle 83 is set in motion the rear portions of the rack-bars 112 will be lowered from the gear-wheels 103 of the printing-wheels 96, so that said rack-bars may not interfere with the rotation of the printing-frame 90. The rack-bars 112 have a sliding motion imparted to them for setting the printing-wheels 96, and, as may be seen in Fig. 10, the said rack-bars have three sets of teeth numbered, respectively, 113, 114, and 115, the teeth 113 being for engagement with the gear-wheels 103, the teeth 114 for engagement with an upwardly-projecting lip 116 when the rear portions of said rack-bars are lowered from the gear-wheels 103, and the teeth 115 being for engagement with gear-wheels 117, by which said rack-bars 112 receive their motion, said teeth 115 remaining at all times in engagement with the said gear-wheels 117, and there being one gear-wheel 117 for each rack-bar 112. The teeth 114 of the rack-bars 112 engage the lip 116 when the rear portions of said rack-bars 112 are lowered for the purpose of locking said rack-bars against having any sliding movement during the rotation of the operating-handle 83 and printing-frame 90. The rack-bars 112 in their rear portions are provided with the elongated slots 118, within which is provided a pin 119, the latter, as hereinafter described, coöperating with said slot 118 to guide and support the rear portions of the rack-bars 112. The pin 119 extends through the slots 118 of all of the rack-bars 112 and is also utilized for effecting the upward and downward movement toward and from the gear-wheels 103 of the rear portions of the rack-bars 112, and when the rear portions of the rack-bars 112 are moved downwardly, so that their teeth 114 engage the locking-lip 116, the said bars 112 are by means of the pin 119 and the mechanism connected therewith locked in such position during all of the time that the operating crank-handle 83 is away from its initial normal at-rest position. The pin 119 is carried by a lever 120, pivotally mounted on a stud 121, secured to the stationary supporting-plate 122, Figs. 5 and 11, for the operative mechanism connected with the printing devices. The lever 120 at its front end carries the pin 119 and at its rear end is pivotally connected by a screw or bolt 123 with a lever-arm 124, Figs. 5, 11, and 14, which is pivotally supported from the aforesaid stationary frame 122 upon a stud-bolt 125 and has a detent 126 at its front end to be engaged by a circular cam-plate 127, fastened, as shown in Fig. 11, by screws upon the right-hand face of the gear-wheel 93 and having a notch 128 at a single point to receive, when the printing-frame 90 is in its normal at-rest position, the detent 126 of the said lever 124. By means of a small spring 129 the detent 126 is normally moved against the periphery of the cam-plate 127. The hole in the rear end of the lever 124, which receives the bolt 123, carried by the lever 120, is a little larger in diameter than the diameter of said bolt in order to allow a little freedom of movement for said bolt, this being required because of the fact that the levers 120 and 124 have different centers.

It has been described above that the rack-bars 112 receive their sliding motion for turning the printing-wheels 96 from the gear-wheels 117. The gear-wheels 117, with the means supporting them, are illustrated in detail in Figs. 15 and 16, in which it will be seen that the said wheels 117 are each secured upon the left-hand end of a shaft, there being four shafts numbered, respectively, 130, 131, 132, and 133, varying in length, and for convenience the shafts 130, 131, and 132 being within the tubular shaft 133. The shafts 131 and 132 are also tubular, while the shaft 130 is a plain rod. The shaft 130 is mounted at its opposite ends in suitable standards 134, secured to a base-plate 135 for the interior operative mechanism of the register, and an intermediate standard 136 serves as a convenient support for the intermediate portions of the several shafts. The right-hand ends of the shafts 130, 131, 132, and 133 are provided with gear-wheels respectively numbered 137, 138, 139, and 140, through which power is imparted for rotating said shafts, said shafts being each independent of the other and each having a gear-wheel 117 on its left-hand end and a gear-wheel on its right-hand end, as shown in Fig. 16. All of the gear-wheels 137, 138, 139, and 140 are engaged by intermediate gear-wheels 141, mounted upon stationary brackets 142, extending frontwardly from the general supporting-framing for the operative parts of the register, and these gear-wheels 141, which are simply intermediate transmitting gear-wheels, are in constant mesh with pinion-wheels 143, also supported from said brackets 142, and the pinion-wheels 143 are in constant mesh with segmental racks 144, secured to the hand actuating or setting levers 52.

The gear-wheels 117 to engage and drive the racks 112 are themselves engaged by a pawl-frame 146, pivotally mounted in a supporting-frame 147 and having four rearwardly-projecting arms to engage the four gear-wheels 117. The frame 146 is in rigid connection with a downwardly and rearwardly extending lever-arm 148, having at its rear end a slot 149, Figs. 6 and 11, receiving a pin 150, carried at the lower end of a pivotally-mounted lever 151, whose upper end is provided with a detent 152 in position to engage at the proper time a pin 153, secured on the left-hand face of the gear-wheel 92, Figs. 3, 5, 11, 14, to lock said gear-wheel 92 against rotation, which is the sole object of the pawl-frame 146 and lever 151. During the rotation of the gear-wheels 117 the pawl-frame 146, lever 148, and lever 151 will have a free rocking motion imparted to them through the passage of the teeth of the gear-wheels 117 against the pawl-frame 146, and the pawl-frame 146 will perform no function unless the operator in moving the hand actuating or setting levers 52 arrest the latter before they reach their full position in line with the numbers on the front face of the register-casing. If the operator should arrest the levers 52 or any of them at a point intermediate any two of the numerals on the front face of the register-casing shown in Fig. 1, the engaging ends of the pawl-frame 146 instead of stopping between two of the teeth of the gear-wheels 117 would be held in their upper position upon the upper outer end of one of the teeth of the said gear-wheels 117, being there held by the then stationary gear wheel or wheels 117. Under this condition the rear end of the lever 148, connected with said pawl-frame 146, would be held in its upwardly-tilted position and would bind against the pin 150 of the lever 151, causing the upper end of the latter to be thrown inwardly to a sufficient extent to pass over the pin 153, carried by the gear-wheel 92, the result being that the detent 152 at the upper end of the lever 151 would prevent the gear-wheel 92 from rotating, and consequently would lock the entire mechanism of the machine against movement, and this condition of the machine could only be remedied by moving the exposed operating-lever 52 to its full movement, so that it would be in direct line with one of the numerals on the front face of the register-casing. Whenever the hand setting-levers 52 are properly moved into complete alinement with the numerals on the front face of the register-casing, the gear-wheels 117 will always come to a stop with the engaging points of the pawl-frame 146 intermediate their teeth, this permitting the inwardly or rearwardly projecting end of the pawl-frame 146 to attain its lower position with the rear end of the lever-arm 148 in its lower position and the pin 150 of the lever 151 free in the elongated slot 149 of said lever-arm 148, the lever-arm 151 then performing no function. The pawl-frame 146, lever-arm 148, and lever 151 are thus provided to compel the operator to move the hand setting-levers 52 into accurate alinement with the numerals on the front face of the register-casing, the said lever 151 when the levers 52 are not thus accurately moved to alinement with the numerals on the register-casing being given the position for locking the power-transmitting gear-wheel 92 and thereby arresting the operation of the machine.

Returning to the rotary printing-frame 90, having described the amount-printing wheels 96 and the means for actuating the same, I will refer to the consecutive-numbering wheels 97 and date-printing wheels 98 99 100, all of which are mounted on a shaft 154, extending transversely of the side plates 94 95 of the printing-frame 90. The consecutive-numbering wheels 97 correspond with one another and each is provided on its periphery with numbers ranging from "0" to "9," inclusive, and on its side with a ratchet-wheel 156. The wheels 97 are shown in position in Fig. 20 and in detail in Figs. 29 to 32, inclusive. The ratchets 156, secured upon the side faces of the numbering-wheels 97, are exactly alike, except that the ratchets 156, connected with the three inner wheels 97, representing units, tens, and hundreds, are each provided with one deep notch, (numbered 157 in Fig. 29.) The ratchets 156 are engaged by spring-pressed pawls 158, Fig. 22, arranged on different planes and all in one integral casting, the purpose of arranging the pawls 158 on different planes and of providing the ratchets 156 with the deep notches 157 being to enable said pawls, one after another, to pass into engagement with the ratchets 156 in a well-known manner for consecutively adding on the wheels 97, these wheels 97, ratchets 156, and pawls 158 being old in this and analogous arts and requiring no special description herein. The object of the wheels 97 is to print in consecutive order a number on the checks issued by the machine, and hence with each rotation of the printing-frame 90 the pawl-frame 158 will be given one thrust to cause the wheels 97 to present a new number in consecutive order to be printed by them on the check-strip. The wheels 97 are prevented from having reverse motion by means of the spring-pressed dogs 160, Figs. 19 and 20. The pawl-frame 158 is pivotally mounted on a shaft 161 and held against the ratchet-wheels 156 by a spring 162, Fig. 19, and the shaft 161 is carried by an arm 163, mounted on a rock-shaft 164, having, Fig. 17, an arm 165 extending toward the axial center of the printing-frame 90 and carrying an inwardly-turned pin 166 within a slot 167 of the side plate 94. A spring 168, Fig. 17, restores the pawl-frame 158 to its normal position. The pin 166 and slot 167 limit the throw of the pawl-frame 158, and the thrust of the frame 158 is caused during each rotation of the printing-frame 90 by the inner end of the arm 165 being carried against a stationary pin 169, Fig. 11, extending inwardly into the path of said arm 165 from the side of the rigid frame-plate 122.

The shaft 154 for the consecutive-numbering wheels 97 is notched, as shown in Figs. 31 and 32, and said wheels 97 carry spring-pressed pawls 170 of known character in engagement with said shaft. One end of the shaft 154 extends outwardly, as shown in Fig. 20, from the side of the printing-frame 90 and is slotted to receive a key. The wheels 97 are free on the shaft 154, and the pawls 170 are utilized in connection with the notch in the shaft 154 to reset the wheels 97 to their "0" position in a well-known manner, the shaft 154 being turned until all of the pawls 170 of the wheels 97 are in the notch of said shaft.

The dating-wheels 98 99 100 are freely mounted upon the shaft 154, and they are arranged to be set by hand. The month-dating wheel 98 is provided in its side with twelve apertures 171, as shown in Fig. 27, the units-dating wheel 99 being provided in its side with ten apertures 172, Fig. 23, and the tens-dating wheel 100 being provided in its side with four apertures 173, Fig. 25, and the purpose of the apertures in the wheels 98, 99, and 100 is to receive a pin 174, Fig. 20, for locking said wheels together and permitting, when the pin 174 is withdrawn, the turning of said wheels in accordance with the date it is desired shall be printed upon the check-strip. The wheel 99 will require to be adjusted every day, the wheel 100 each ten days, and the wheel 98 each month.

The department-printing wheel 101 is mounted on a shaft 200, carried by the side plates 94 95 of the rotary printing-frame 90, and upon the outer end of the shaft 200 is secured a gear-wheel 201, by which motion is imparted to the shaft 200 for the purpose of setting the wheel 101 in accordance with the nature of the transaction to be printed by said wheel upon the check-strip, the purpose of the wheel 101 being to print upon the check-strip an indication of the department from which the sales are made, such as drugs, cigars, and the like. Upon the shaft 200, carrying the department-printing wheel 101, is mounted, by means of a sleeve 202, Fig. 20, the initial-wheel 102, the latter bearing upon its periphery in type various initials or characters denoting the salesmen operating the machine, the purpose of the wheel 102 being to print upon the check-strip the initial of the salesman making the sale and operating the machine. Upon the outer end of the sleeve or tubular shaft 202, carrying the initial-printing wheel 102, is secured a gear-wheel 203, by means of which the wheel 102 may be properly set before the printing-frame 90 is set in motion. The gear-wheels 201 and 203 are each engaged by a pivoted dog 204, yieldingly held against said wheels by means of springs 205, Fig. 18, these dogs 204 allowing the gear-wheels 201 and 203 when the printing-frame 90 is in its initial position to be rotated under yielding restraint in either direction; but during the rotation of the printing-frame 90 the inner shank ends of the dogs 204 will ride around and against a stationary hub 180, Fig. 11, on the frame-plate 122, and thereby said dogs 204 will lock the wheels 201 203 and wheels 101 and 102 against rotation during the movement of said frame 90. The hub 180 has a recess 181, Fig. 11, and the presence of this recess allows the dogs 204 to have the necessary vibration during the setting of the wheels 101 and 102 when the frame 90 is in its initial at-rest position. The printing-wheels 101 and 102 are to be manually operated by the attendant at the time he operates the hand setting-levers 52 and before he operates the exposed crank-handle 83, and the means for setting the printing-wheels 101 and 102 are the segments 206 and 207, having the outwardly-projecting handles (numbered, respectively, 208 and 209, Figs. 3, 10, 11, and 14.) The segments 206 and 207 correspond with each other in construction and are pivotally mounted side by side upon a stationary stud 210, and each of the segments 206 207 is provided with an upper series of teeth 211 and a lower series of teeth 212, the teeth 212 of the segment 206 being in mesh with the intermediate gear-wheel 301, normally engaging the gear-wheel 201 on the shaft 200 for the department-printing wheel 101, while the teeth 212 of the segment 207 are in mesh with the intermediate gear-wheel 302, normally engaging the gear-wheel 203 on the tubular shaft 202 for the initial-printing wheel 102, the said teeth 212 and gear-wheels 301 and 302 and 201 and 203 being always in mesh while the printing-frame 90 is in its normal at-rest position, as shown in Fig. 10. The printing-wheels 101 and 102 are manually set by the operator when the printing-frame 90 is in its initial at-rest position, and upon the starting in rotation of the printing-frame 90 the gear-wheels 201 and 203 will be carried from the intermediate gear-wheels 301 and 302.

It may be desirable to indicate to the customer the matter the operator sets the wheels 101 and 102 to print on the check-strip, and to this end the segments 206 207 are provided with the upper series of teeth 211, which are in constant mesh with gear-wheels 213 and 214, respectively, the wheel 213 being rigid on a tubular shaft 215, carrying a department-indicating cylinder 216, Fig. 9, while the gear-wheel 214 is rigid on the tubular shaft 217, mounted to turn freely upon the said shaft 215 and carrying the initial-indicating cylinder 218. The tubular shafts 215 and 217 are supported upon a stationary rod or shaft 219, extending transversely between and supported by the upper extending arms of the stationary frame-plates 122 and 220. Upon the movement of the segment 206 to set the department-printing wheel 101 the upper teeth 211 of said segment will operate through the gear-wheel 213 and shaft 215 to rotate and set the department-indicating cylinder 216, and when the segment 207 is moved to set the initial-printing wheel 102 the upper teeth 211 of said segment will operate through the gear-wheel 214 and shaft 217 to correspondingly set the initial-indicating cylinder 218. The cylinders 216 and 218 are provided on their periphery, as shown in Fig. 3, with the same matter represented by the types on the printing-wheels 101 and 102; but, as may be observed upon a comparison of Figs. 3 and 6, the indicating-cylinders 216 and 218 have the printed matter so disposed on them that said matter may be read from both the front and back of the register through windows 221 and 222, disposed at the front and back of the auxiliary portion 223, Figs. 1 and 6, of the main register-casing 50, front and back indication being thus provided in respect of the indicating-cylinders 216 and 218, and upon reference to Fig. 3 it will be seen that the printed matter thereon is arranged in lines and that each alternate line appears from the front of the casing to be upside down and reversed—as, for example, in the position in which the parts are shown in Fig. 3 the salesman's initial "I" and the word "Soda" would appear at the window 221 at the front of the casing and read correctly for the operator, while at the rear of the indicating-cylinders 216 218 the letter "I" and the word "Soda" would appear through the rear window 222 of the register-casing, and in this instance in order that the customer might correctly read the same the word "Soda" would have to appear in reverse order to the word "Soda" at the front of the said cylinders, so that the customer might be able to read the same from left to right. The words and letters on the indicating-cylinders 216 218 are duplicated at the opposite sides of said cylinders and the corresponding words and letters are arranged in reverse order, so that they may be read from the opposite sides of the register-casing. The words and letters on the department and initial printing wheels 101 and 102 are not in duplicate nor arranged in reverse order, and the duplication and reversal of the words and letters on the indicating-cylinders 216 218 are only for the purpose of enabling both the operator and customer to read the same and to provide for front and back indication. The handles 208 209 for operating the segments 206 207 for setting the indicating-cylinders 216 and 218 and department and initial printing wheels 101 and 102 extend frontwardly through slots 224 in the front face of the auxiliary portion 223, Fig. 1, of the general register-casing 50, and this portion 223 of the register-casing is provided with a delivery-slot 225 for the printed checks. At the extreme lower end of the segments 206 and 207 there is provided a stop 226, Fig. 6, in the nature of an enlarged tooth, which will prevent during the downward motion of the handles 208 209 the inward passage of the teeth 212 of said segments beyond the gear-wheels 301 and 302; but the stops 226 are not essential, because the length of the slots 224 in the auxiliary register-casing 223 will be such as to prevent any undue movement in either direction of the said segments 206 and 207.

Since upon the rotation of the printing-frame 90 the gear-wheels 201 and 203 for the department and initial printing wheels 102 and 103 are carried downward from the intermediate gear-wheels 301 and 302, respectively, I mount the said gear-wheels 301 and 302 upon a stud 227, carried by a pivotally-mounted arm 228, hung upon the stud 210 for the segments 206 and 207, and provide means for moving the arm 228 toward the front when the printing-frame 90 starts in motion, so that the gear-wheels 301 302 may leave the gear-wheels 201 203 connected with the shafts of the said department and initial printing wheels 101 and 102. The arm 228 is by means of a spring 229 normally drawn toward the rear, so as to place the gear-wheels 301 302 into mesh with the gear-wheels 201 203, carried by the printing-frame 90; but upon the left-hand end of the shaft 91 of the printing-frame 90 I secure a cam-plate 230, Figs. 6, 7, and 8, having at one edge a recess 231, which in the initial position of the printing-frame 90 will be in line with, as shown in Fig. 6, a small roller 232, carried at the lower end of the arm 228, for the intermediate gear-wheels 301 and 302. When the recess 231 of the cam 230 is in the position shown in Fig. 6, the segments 206 and 207 and gear-wheels 301 and 302 may be freely moved to set the department and initial printing wheels 101 102, because at such time the gear-wheels 301 302 will be in full mesh with the gear-wheels 201 203, carried by the printing-frame 90; but when the department and initial printing wheels 101 102 have been set and the operating crank-handle 83 is set in motion the recess 231 of the cam 230 will pass from the roller 232 of the arm 228, and the concentric periphery of the cam 230 will ride against the said roller, thereby first moving the arm 228 toward the front for carrying the gear-wheels 301 302 from the gear-wheels 201 203 and then maintaining this disengagement of the said gear-wheels during all of the rotary motion of the printing-frame 90 and cam 230. When the cam 230 moves the arm 228 frontwardly, the gear-wheels 301 and 302 will be carried against the stop 233, Fig. 10, which will enter between their teeth and prevent them from having any rotation, this locking of the gear-wheels 301 and 302 against rotation during the movement of the printing-frame 90 operating also to lock the segments 206 207 against movement, since said gear-wheels are always in mesh with the teeth 212 of said segments.

The gear-wheels 213 214, connected with the shafts of the department and initial indicating cylinders 216 and 218, are restrained against undue freedom by means of the spring-pressed pawls 234, which when the printing-frame 90 is in its initial position allow the said gear-wheels to be rotated in either direction by the teeth 211 of the segments 206 and 207, these pawls 234 being pivotally secured upon a stud 235, extending inwardly toward the right from the extreme left-hand stationary supporting frame or plate 220. Springs 236 keep the upper end of the pawls 234 against the gear-wheels 213 and 214.
The pawls 234 have rearwardly-extending lower arms 237, which terminate directly over a pin 238, carried by a pivoted lever-arm 239, Fig. 6, which is pivoted upon the outer face of the stationary frame-plate 220 and is given a spring tension upward by means of a coil-spring 240. The pin 238 extends inwardly through a slot 241, formed in the frame-plate 220, this slot allowing said pin to have a limited vertical movement. The front end of the lever 239 is in the form of a hinge-section 242, having a detent 243 to engage at the proper time a pin 244, carried on the inner face of the cam 230, for locking said cam and its shaft 91 and all parts connected with said shaft against movement. The purpose of the lever-arm 239 and pin 244 is to compel the operator when moving the department and initial indicating cylinders 216 and 218 to fully and fairly expose the indication through the front and rear windows 221 and 222 of the register-casing and not to be able to stop said indicating-cylinders at a point midway between the lines of printed matter thereon. During the movement of the indicating-cylinders 216 and 218 the latter will properly be allowed to come to a rest when the detents at the upper ends of the pawls 234 are intermediate the teeth of the gear-wheels 213 and 214; but should the operator, not desiring to give the cylinders 216 and 218 the correct movement for fairly exposing the indication, stop the said indicating-cylinders 216 and 218 at a time when the detent at the upper ends of the pawls 234 are against the outer ends of the teeth of the gear-wheels 213 214 instead of when they are in between said teeth the upper portions of the said pawls 234 will, by reason of being arrested on the outer ends of the teeth 213 214, be held in a rear position and the lower arms 237 of said pawls will be held in their extreme down position, and when in such down position will press downwardly against the pin 238 of the lever 239, thereby causing the front section 242 of said lever to be moved and held downwardly against the stress of the spring 240, with the result that the detent 243, carried by said section 242, will pass into position to contact with the pin 244 of the cam 230 as soon as the printing-frame 90 is set in motion, the said detent 243 and pin 244 thus under such condition operating to prevent the movement of the shaft 91 and printing-frame 90. Whenever the indicating-cylinders 216 218 are arrested with the detent end of the pawls 234 intermediate the teeth of the gear-wheels 213 214, the lower arms 237 of said pawls will be at such elevation as to permit the spring 240 to hold the lever 239 at a sufficient elevation to prevent the detent 243 of its section 242 from locking with the pin 244 of the cam 230 upon the movement of the printing-frame 90. The front section 242 of the lever 239 is hinged, so that when the pawls 234 are in their proper position, (shown in Fig. 6,) any contact of the pin 244 with the extreme lower edge of the detent 243 will simply result in said detent being moved slightly upward by the curved surfaces of said pin without the plate 230 becoming locked. When the lever 239 is in its extreme lower position, the detent 243 will pass into such relation to the pin 244 that the latter will be unable to elevate said detent, but will be securely held thereby.

Returning to the rotary printing-frame 90, I provide thereon a stationary transverse plate 245, Fig. 19, having type on its outer face for printing on the check-strip an advertisement. The printing-frame 90 thus carries the amount-registering wheels 96, the consecutive check-numbering wheels 97, the dating-wheels 98 99 100, the department and initial printing wheels 101 102, and the advertisement-printing plate 245, and all of said wheels and said plate print upon the check-strip, (numbered 246,) while only the amount-printing wheels 96, department-printing wheel 101, and initial-printing wheel 102 print upon the detail-strip, (numbered 247,) and I will now describe the mechanism for carrying and feeding and effecting the printing upon the detail-strip 247.

The detail-strip 247 and the mechanism directly connected with the same are shown in detail in Figs. 33 to 40, inclusive. The main body of the strip 247 is reeled upon a roller 248, Fig. 39, which is mounted upon a sleeve 249, supported upon a stationary screw-stud 250, which is fastened at one end to the upper end of the main supporting-plate 251 for the detail-strip mechanism. The outer reduced end of the sleeve 249 is threaded, as shown in Fig. 39, to receive a nut 252, between the head of which and the head or flange 253 on the sleeve 249 the roller 248 is detachably clamped. A spring 254 between the head of the screw-stud 250 and the outer end of the sleeve 249 serves to place the latter under a yielding tension, whereby said sleeve and roller 248, with the detail-strip 247 on said roller, are prevented from having too free rotation, and whereby also the detail-strip 247 when being unreeled from the roller 248 is kept under a light tension. The detail-strip 247 as unwound from the roller 248 is wound upon a receiving-roller 255, Fig. 37, carried by a screw-stud 256, which at one end screws into the aforesaid supporting-frame 251. The roller 255 comprises a body portion 257, through which the stud 256 passes and upon which is placed the split sleeve 258, Fig. 38, upon which the paper detail-strip is directly wound, the extreme end edge of the paper being first fastened to the roller 255 by being passed through the slit 259 in the sleeve 258 and then into a groove or slit 260 when the latter and the slit 259 are in line with each other, as shown in Fig. 35. After the extreme edge of the detail-strip has been inserted into the slits 259 and 260 the sleeve 258 is turned to the position in which it is shown in Fig. 36, thereby carrying the slit 259 from the slit 260 and pinching the edge of the detail-strip between the sleeve 258 and the body 257 of the roller 255. The turning of the sleeve 258 from the position in which it is shown in Fig. 35 to that in which it is shown in Fig. 36 carries a recess 261 in said sleeve 258 into line with the screw-hole 262 in the outer end of the body portion 257, and thereupon the sleeve 258 will be locked in position to effectually hold the end edge of the detail-strip by means of a screw 263, Fig. 37, whose threaded end will enter the aforesaid hole 262 and whose hub 264 will enter the recess 261 of the sleeve 258 and prevent the latter from rotating, except with the body portion 257. The feeding of the detail-strip from the roller 248 to the receiving-roller 255 is accomplished by pawl-and-ratchet mechanism, and hence upon the inner end of the roller 255 is provided a ratchet-wheel 265, which is prevented from having reverse motion or undue momentum by means of a spring-pressed dog 266, Fig. 33, and is adapted to be driven intermittently by means of a driving-pawl 267, the dog 266 being pivotally secured upon the frame 251 and the pawl 267 being pivotally secured upon the outer lower end of the lever 268, which is pivoted at its upper inner end upon the frame 251 and is guided and restrained by a small box-loop 269, Fig. 34, secured upon the right-hand face of the frame 251. The lever 268 carries a pin 270, by which movement in an upwardly direction is imparted to the lower front end of said lever for the purpose of driving the pawl 267 upwardly to rotate the ratchet-wheel 265 and roller 255 for winding on the latter at the proper intervals the detail-strip. The downward motion of the lever 268 and pawl 267 to their initial position is accomplished by means of the spring 271, Fig. 33, and any undue upward movement of the pawl 267 is prevented by means of a stop 272, secured upon the frame 251 and recessed at its lower side to receive the angular upper end of the pawl 267 when the latter has reached its extreme upward position. The means for engaging the pin 270 of the lever 268 to drive the pawl 267 are shown in Figs. 3, 11, and 14 and comprise a pivoted lever 273, having a slotted outer end 274, engaging the aforesaid pin 270, the said lever 273 also having a rearwardly-projecting arm 474, Fig. 11, terminating in a position to be engaged by the pins 275 276, carried by the plate 127, fastened upon the right-hand face of the driving gear-wheel 93, which pins are utilized during the rotation of the wheel 93 and printing-frame 90 to depress the rear end of the lever 273 and turn the front end of said lever upwardly, the front end of the lever 273 with each of its upward movements driving the pawl 267 upwardly against the ratchet-wheel 265 and effecting a limited rotation of the receiving-roller 255. By reason of the fact that there are only two pins 275 276 upon the gear-wheel 93 to act upon the lever 273 there will during each rotation of said gear-wheel only be two upward throws imparted to the pawl 267, and hence there will only be two feeding movements of the detail-strip from the roller 248 to the roller 255 with each operation of the machine, the reason for this being that on the detail-strip only two lines of printing are applied, one being the amount of the sale from the printing-wheels 96 and the other being the department and initial data from the department and initial printing wheels 101 102. The feeding of the detail-strip by means of the pawl 267 takes place just when the printing-wheels of the frame 90 are rolling against the detail-strip, and this only occurs after the detail-strip and its frame have been tilted inwardly to meet the printing-frame 90 during the rotation of the latter. The frame 251, Fig. 33, has connected with it and comprising a part of the detail-strip-supporting frame a plate 277, between which and the main portion of the frame 251 are mounted an impression-roller 278 and a guiding-roller 279, and the strip 247 passes from the roller 248 first below the roller 279 and then over the impression-roller 278, and thence to the roller 255, as indicated in Fig. 33. The printing on the detail-strip is performed during the movement of said strip over the impression-roller 278 and when the latter has been tilted inwardly to press the paper against the type of the rotary printing-frame 90. The frame 251 carries on the pivoted arm 280 an inking-roller 281, which has a downward spring tension by reason of a spring 282 connected with it and is at all times in contact with the printing-wheel 90, so that all of the type carried by said printing-wheel will during the rotation of said wheel 90 be carried against the roller 281. At the lower inner end of the plate 277 is secured a pivoted toe 283, having a downwardly-inclined outer edge, as shown in Fig. 33, and this toe 283 is yieldingly held upward by means of a spring 284, so that a pin 285, carried by it, may be normally held against a shoulder 286, formed on the plate 277, as shown in Fig. 33. The purpose of the spring 284 is to permit the inclined end of the toe 283 to be moved downwardly and thereafter to return the toe 283 to its normal position. The frame 251 is pivotally mounted upon a rod 287, the latter being stationary and the frame 251 being merely set upon the same and being provided, as shown in Fig. 33, with open slots 288 to pass upon said rod 287. Upon setting the frame 251 upon the rod 287 care will be taken that the pin 270, carried by the lever 268, is inserted in the slotted inner end 274 of the actuating-lever 273, and the frame 251 will be loosely secured upon the said rod 287 by means of a rod 289, Figs. 6 and 10, which will be held at its ends in the stationary framing for the operative mechanism and loosely passed through apertures 290 in the frame 251 and its connected plate 277, the apertures 290 being sufficiently large to permit the frame 251 to have a limited tilting action imparted to it from the printing-frame 90. Below the apertures 290 in the frame 251 and plate 277 is the transverse bar 291, having a screw 292. The screw 292 is an adjustable stop, which may be brought more or less closely to the rod 289 for the purpose of preventing any undue turning or tilting action of the frame 251. When the apertures 290 in the frame 251 and plate 277 are of exactly the right diameter in relation to the diameter of the rod 289, the screw-stop 292 is not necessary; but should it be found that the apertures 290 are a little too great in diameter the screw 292 may be moved upwardly below the rod 289 and limit the action of the frame 251 by contacting with said rod when the frame has tilted inwardly to a sufficient extent. The screw 292 being below the rod 289 will also serve to prevent the frame 251 from rising upwardly from the shaft or rod 287.

The means for tilting the detail-strip frame 251 inwardly to meet the printing-frame 90 comprise the arms 293 294, secured upon the outer or left-hand plate 95 of the printing-frame 90, Fig. 18, which during the rotation of the frame 90 contact with the toe 283, carried by the said frame 251, and turn said frame 251 inwardly toward the frame 90, with the result of carrying the impression-roll 278, with the strip thereon, against the printing-wheels of the frame 90. There are only two arms 293 294 on the printing-frame 90 for contact with the toe 283 of the frame 251, because it is only desired that the frame 251 shall be tilted inwardly twice during one rotation of the frame 90, this being for the reason that only two lines of printed matter are applied upon the detail-strip 247. When the arms 293 294 are moved against the toe 283 of the frame 251, the latter is tilted inwardly and the impression-roller 278 then presses the detail-strip against the type of the printing-frame 90, and while the said arms 293 294 are leaving the toe 283 they force the same downwardly against the stress of the spring 284, thereby yieldingly pressing the detail-strip against the type of the printing-frame 90. After each arm 293 294 leaves the toe the spring 284 will return the latter to its normal position, and by gravity the general detail-strip frame 251 will drop back to its normal position, carrying the impression-roller 278 from contact with the type of the printing-frame 90. The feeding of the detail-strip 247 is performed just at the time that the arms 293 294 are pressing the impression-roller 278 against the type of the printing-frame 90.

If it should not be desired to employ the detail-strip 247, the owner of the register may detach the same by simply withdrawing the rod 289 from the apertures 290 of the frame 251 and plate 277 and elevate said frame from the supporting-rod 287, the pin 270 at such time readily leaving the slotted front end of the lever 273.

The check-strip 246 is wound upon a roller 295, Fig. 6, supported upon a pin 296, extending between the rear portions of the stationary plates 122 220, comprised in the main supporting-frame for the operative parts of the machine, and the strip 246 is placed under a yielding restraining tension by means of a leaf or plate 297, whose outer end presses against the roll of paper comprising the check-strip 246 and prevents the too ready unwinding of said strip and the too free rotation of the roller 295. The check-strip 246 from the roller 295 passes inwardly between two metal guiding-rolls 298 299, Fig. 10, then between two rubber-surfaced feeding-rolls 300 303, then below the rubber-surfaced roll 304, then above the lower cutter-bar 305 and below the knife 306, then above the rod 307, and then out through the delivery-opening 225, hereinbefore referred to, provided in the front face of the auxiliary portion 223, Fig. 1, of the general register-casing 50. The feeding of the check-strip 246 is accomplished by the movement against the same of the rubber-surfaced rollers 300 and 303, and the printing on said strip is performed while the strip is passing below the impression-roller 304. The metal rollers 298 and 299 are in the nature of guiding-rollers. The rollers 298 299 303 304 are journaled between the sides 308 309 of a tiltable frame (shown more particularly in Figs. 41, 42, and 43) carrying the knives 305 and 306 for cutting the checks after having been printed from the end of the check-strip 246, and the roller 300 is mounted between the inwardly-projecting ends of a plate 310, Figs. 10 and 42, and a lever-arm 311, said plate 310 and said lever-arm 311 being connected by a rod 312 and constituting a frame pivotally mounted upon the shaft for the upper metal roller 298. The plate 310 and lever-arm 311 are pivotally mounted, because it is only desired that they shall hold the rubber roller 300 down against the check-strip on the roller 303 at such time as it may be desired that the check-strip shall feed inward below the roller 304. The lever-arm 311 is normally given a downward tension, holding the feed-roller 300 upward clear of the check-strip by means of a coiled spring 313, Fig. 41, which is fastened at its upper end to said lever-arm 311 and at its lower end with a stationary frame-plate 122, as shown in Fig. 11. To the lower end of the lever-arm 311 is pivotally mounted an arm 314, having a stop 315 to engage the inner edge of the lever-arm 311, Fig. 41, to prevent said arm 314 from turning frontwardly at its lower end, and the lever-arm 311 carries a spring 316, flexed against the lower portion of the arm 314 for yieldingly resisting the movement in a rearward direction of the lower end or portion of said arm. The lever-arm 311 and pivoted arm 314 are utilized in connection with the printing-frame 90 for determining when the upper roller 300 shall coact with the roller 303 in feeding the check-strip, and the rotation of the lower roller 303 is effected through the gear-wheel 317 on the end thereof, the intermediate gear-wheel 318, in mesh with said gear-wheel 317, and the gear-wheel 319, secured upon the right-hand face of the printing-frame 90 and in constant mesh with the intermediate gear-wheel 318. With every rotation of the printing-frame 90 its gear-wheel 319 will effect the rotation of the intermediate gear-wheel 318, gear-wheel 317, and lower roller 303; but the check-strip will only be fed when the upper roller 300 is in its lower position, pressing said strip against the roller 303. The only function performed by the large gear-wheel 319, carried by the printing-frame 90, is through the intermediate gear-wheel 318 to rotate the gear-wheel 317 and roller 303. The arm 314, carried by the lever-arm 311, is by means of the spring 316 held against the side plate 94 of the printing-frame 90, and this side plate 94 at its periphery constitutes a cam having four projecting portions 320, 321, 322, and 323, which ride against the arm 314 when the frame 90 is rotated. When the aforesaid projections 320, 321, 322, and 323 are riding against the arm 314, they will press the lower rear portion of the lever-arm 311 outwardly and cause said lever-arm to move the roller 300 against the check-strip, and when during the rotation of the frame 90 the arm 314 is riding on the periphery of the plate 94 intermediate the said projections thereon the spring 313 will tilt the lever-arm 311 sufficiently to elevate the roller 300 from the strip. Thus when during the rotation of the frame 90 the strip 246 is feeding the projections 320, 321, 322, and 323 will maintain the roller 300 in its lower position against the check-strip, and the said projections are so disposed that they hold the roller 300 in its lower position at the time the type-wheels and advertisement-plate of the printing-frame 90 are in the act of printing upon the check-strip, the said frame 90 rolling against the check-strip at the same time the check-strip is being fed onward.

The frame comprising the sides 308 309 and carrying the impression-roller 304 and knives 305 306 is pivotally mounted upon the shaft of the metal roller 299, the sides 308 and 309 being apertured, as at 324, Fig. 41, to receive said shaft, which is secured at its ends in stationary supporting-frame plates 122 220 and is in the form of a stationary rod numbered 235 and operates as a pivot for the pawls 234, hereinbefore referred to. The frame comprising the sides 308 and 309 is given a spring tension causing its front end to tilt downwardly by means of a coiled spring 325, connected at one end to a rod 326, carried by said sides, and at the other end to a rod 327, extending between the stationary frame-plates 122 220, and the frame comprising the sides 308 309 is prevented from tilting too far downwardly at its front end by the contact of a stop-pin 328, Figs. 14, 41, and 42, with the stationary frame-plate 122. The spring 325 normally retains the pin 328 against the stationary frame-plate 122, and thus normally holds the impression-roller 304 in its lower position; but when the type of the printing-frame 90 move against the check-strip below the impression-roller 304 they press said roller and the frame carrying it upwardly to a slight extent, thereby creating the proper tension on the roller 304 to effect the proper printing impression on the check-strip. If it should be desired to stop the printing on the check-strip, the roller 304 may be held in a sufficiently-elevated position to enable the type of the frame 90 to pass the check-strip without contacting with it by means of a dog 428, fulcrumed on the rod 327, Figs. 10 and 14, and adapted to engage the rod 326, carried by the frame sides 308 309. In Fig. 10 the impression-roller 304 is in its lower normal position, and when it is desired to hold said roller out of operative position the front end of the frame sides 308 309 will be tilted upwardly until the notch 329 of the dog 428 drops in front of the rod 326 and enables the dog 428 to operate as a brace for propping the frame sides 308 309 in their then upwardly-tilted position. Upon releasing the notch of the dog 428 from the rod 326 the spring 325 will restore the frame sides 308 309 and roller 304 to its lower position.

At the front end of the frame sides 308 309 is a laterally-extending arm 330 and forwardly-extending bracket-arms 331, Figs. 41, 42, and 43, and to the laterally-extending arm 330 is pivotally secured the knife 306, which is adapted to have a vertical movement between a face-plate 332, carried at the front end of the sides 308 309, and a guide-plate 333, Fig. 43. The knife 306 is normally held in an upward position by means of a coiled spring 334 and coöperates in severing the checks from the check-strip with a lower rigid knife-bar 305, above which is provided a slot 335, through which the check-strip may pass and at which the checks are severed from said strip. The right-hand end of the knife 306 projects laterally beyond the frame side 309 and passes below the upper curved end of a pivoted lever 336, Figs. 3 and 11, by which said knife 306 is operated. The lever 336 is pivoted to a portion of the stationary frame 122 and is connected by a rod 337 with a pivoted plate 338, Figs. 11, 12, and 13, which plate 338 is normally drawn rearwardly by means of a light coil-spring 339 and is provided with the laterally-extending lip 340, by which said plate 338 is operated at the proper time to draw on the rod 337 and turn the upwardly-curved end of the lever 336 in a downward direction against the knife 306 for depressing the latter and effecting the cutting off of the check from the check-strip. Under normal conditions the spring 334, connected with the knife 306, will be sufficient to return the knife 306 to its upward position and the lever 336 to its normal position, in which position it will simply press very lightly upon the end of the knife 306 without moving the same, being there held by the tension of the spring 339. The plate 338 is actuated to move the lever 336 and knife 306 one time during the rotation of the printing-frame 90, this frame 90 carrying on the side of the gear-wheel 319 an arm 341, (shown by full lines in Fig. 17 and dotted lines in Fig. 11,) which during the rotation of the said frame 90 will move upwardly against the lower side of the lip 340 of the plate 338 and turn the front end of said plate upwardly and toward the rear, and thereby causing said plate 338 to move the rod 337 rearwardly and turn the upper curved end of the lever 336 downwardly and rearwardly against the knife 306. The rod 337 is provided with a notch to detachably engage a pin on the lever 336, as shown by solid lines in Fig. 11, and the said rod 337 is at its extreme front end provided with an additional notch 342, which may be applied upon the pin 343 of the lever 336 when it is desired that said lever shall be given a position entirely free of the knife 306, this only being desired when the knife 306 is to be put out of use and no checks are to be severed.

In the brackets 331 at the front end of the frame sides 308 309 is mounted a rod 344, from which a frame comprising side arms 345 346 and lower rod 307, Figs. 41, 42, 43, is pivotally suspended, and the lower portion of which frame is normally turned with a yielding tension close below the upper edge of the exit-slot 335 for checks by means of a coiled spring 347. The essential feature of this pivoted frame is the lower rod 307, over which the printing check-strip passes and which is provided with small annular shoulders 348 to prevent the lower printed surface of the check from becoming blurred during its passage over said rod 307. The bevel edge of the knife 306 when the latter moves downwardly will pass between the rod 307 and knife-bar 305, and at such time under the pressure of said knife 306 the bar 307 will swing outwardly against the stress of the spring 347. The rod 307 supports the check-strip at one side of the line of severance during the action of the knife 306. The type for the printing-frame 90 receive their ink from the ink-roller 281, carried by the detail-strip frame, as above described, and also from the ink-roller 349, carried by a substantially vertical arm 350, mounted upon the shaft 351, Figs. 10 and 11, and having connected with it a small arm 352, against which a spring 353 is flexed to press the arm 350 and roller 349 to their operative position. The upper end of the arm 350 is adapted, as shown in Fig. 10, to contact with the metal guide-roller 299, whereby the arm 350 and ink-roller 349 are held in their operative position, but are adapted to yield slightly under the pressure of the type carried by the frame 90, so as to place said roller 349 under the tension of the spring 353.

The operation of the several parts of the machine has been so fully described in connection with the explanation of the construction of said parts that it is believed a further detailed description of the operation is not required. In practical use the operator will move the hand setting-levers 52, as heretofore, for the purpose of setting the segments 53 preparatory to their being enabled to turn the registering-wheels 55, and in the present instance the operation of the hand setting-levers 52 results, through the intermediate shafts and gearing and sliding racks 112, in setting the amount-printing wheels 96 to correspond with the amount of the sale. The operator will also, by means of the handles 208 and 209, properly adjust the department and initial printing wheels 101 and 102 and effect the proper movement of the department and initial indicating cylinders 216 and 218, and thereupon the exposed crank-handle 83 will be given a complete rotation for the purpose of returning the segments 53 to their normal position, as heretofore, in a well-known manner and causing them to rotate the registering-wheels 55. The movement of the exposed crank-handle 83 imparts motion to the shaft 82 and through said shaft and intermediate mechanism to the rotary printing-frame 90 and the features connected with the feeding of the detail and check strips and the cutting off of the checks after being printed from the check-strip, the checks being delivered through the slot 225 in the register-casing.

What I claim as my invention, and desire to secure by Letters Patent, is—

1. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments, combined with the exposed operating-handle, the rotary printing-frame operable from said handle, the amount-printing wheels carried by said printing-frame and having gear-wheels connected therewith, the sliding rack-bars for setting said printing-wheels upon the movement of said hand-levers, mechanism intermediate said hand-levers and said sliding rack-bars for imparting movement to said bars from said hand-levers, means for disengaging said rack-bars and printing-wheels preparatory to the rotation of the printing-frame, and means for feeding a strip to be printed upon by said wheels during the rotation of the printing-frame; substantially as set forth.

2. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments, combined with the exposed operating-handle, the rotary printing-frame operable from said handle, the amount-printing wheels carried by said printing-frame and having gear-wheels connected therewith, the sliding rack-bars for setting said printing-wheels upon the movement of said hand-levers, mechanism intermediate said hand-levers and said sliding rack-bars for imparting movement to said bars from said hand-levers, means for disengaging said rack-bars and printing-wheels preparatory to the rotation of the printing-frame, means for feeding a strip to be printed upon by said wheels during the rotation of said printing-frame, means for locking said rack-bars during the rotation of said printing-frame, and means for locking said wheels during the rotation of said frames; substantially as set forth.

3. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments when the latter are moved by said shaft, combined with the auxiliary driving-shaft, the operating crank-handle connected with said auxiliary driving-shaft, the crank-pin carried by said auxiliary shaft, the crank on said main operating-shaft, the rod connecting said crank-pin and crank for imparting a partial rotary motion to said main operating-shaft from and back to its initial position during the rotation of said auxiliary shaft, the rotary printing-frame geared to said auxiliary shaft and operable therefrom, type-printing wheels carried by said printing-frame, means for automatically setting said printing-wheels to correspond with the amount of a sale from and by the movement of said actuating hand-levers, and means for feeding a strip to be printed upon by said wheels during the rotation of said printing-frame; substantially as set forth.

4. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments when the latter are moved by said shaft, combined with the auxiliary driving-shaft, the operating crank-handle connected with said auxiliary driving-shaft, the crank-pin carried by said auxiliary shaft, the crank on said main operating-shaft, the rod connecting said crank-pin and crank for imparting a partial rotary motion to said main operating-shaft from and back to its initial position during the rotation of said auxiliary shaft, the rotary printing-frame geared to said auxiliary shaft and operable therefrom, type-printing wheels carried by said printing-frame and having gear-wheels connected therewith, the sliding rack-bars for setting said printing-wheels upon the movement of said hand-levers, mechanism intermediate said hand-levers and said sliding rack-bars for imparting movement to said bars from said hand-levers, means for disengaging said rack-bars and printing-wheels preparatory to the rotation of the printing-frame, and means for feeding a strip to be printed upon by said wheels during the rotation of the printing-frame; substantially as set forth.

5. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments when the latter are moved by said shaft, combined with the auxiliary driving-shaft, the operating crank-handle connected with said auxiliary driving-shaft, the crank-pin carried by said auxiliary shaft, the crank on said main operating-shaft, the rod connecting said crank-pin and crank for imparting a partial rotary motion to said main operating-shaft from and back to its initial position during the rotation of said auxiliary shaft, the rotary printing-frame geared to said auxiliary shaft and operable therefrom, type-printing wheels carried by said printing-frame and having gear-wheels connected therewith, the sliding rack-bars for setting said printing-wheels upon the movement of said hand-levers, mechanism intermediate said hand-levers and said sliding rack-bars for imparting movement to said bars from said hand-levers, means for disengaging said rack-bars and printing-wheels preparatory to the rotation of the printing-frame, means for feeding a strip to be printed upon by said wheels during the rotation of said printing-frame, means for locking said rack-bars during the rotation of said printing-frame, and means for locking said wheels during the rotation of said frame; substantially as set forth.

6. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments when the latter are moved by said shaft, combined with the auxiliary driving-shaft, the operating crank-handle connected with said auxiliary driving-shaft, means connecting said auxiliary shaft to said main operating-shaft for imparting to the latter a partial rotary motion from and back to its initial position during a rotation of said auxiliary shaft, the rotary printing-frame geared to said auxiliary shaft and operable therefrom, type-printing wheels carried by said printing-frame, means for automatically setting said printing-wheels to correspond with the amount of a sale from and by the movement of said actuating hand-levers, and means for feeding a strip to be printed upon by said wheels during the rotation of said printing-frame; substantially as set forth.

7. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments when the latter are moved by said shaft, combined with the exposed operating-handle, the rotary printing-frame operable from said handle, the amount-printing wheels carried by said printing-frame and having gear-wheels connected therewith, the sliding rack-bars for setting said printing-wheels upon the movement of said hand-levers, mechanism intermediate said hand-levers and said sliding rack-bars for imparting movement to said bars from said hand-levers, means for disengaging said rack-bars and printing-wheels preparatory to the rotation of the printing-frame, means for feeding two independent strips to be printed upon by said wheels during the rotation of said printing-frame, and means for severing the end from one of said strips to form a check at each operation of the machine; substantially as set forth.

8. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments when the latter are moved by said shaft, combined with the exposed operating-handle, the rotary printing-frame operable from said handle, the amount-printing wheels carried by said printing-frame and having gear-wheels connected therewith, the sliding rack-bars for setting said printing-wheels upon the movement of said hand-levers, mechanism intermediate said hand-levers and said sliding rack-bars for imparting movement to said bars from said hand-levers, means for disengaging said rack-bars and printing-wheels preparatory to the rotation of the printing-frame, means for feeding two independent strips to be printed upon by said wheels during the rotation of said printing-frame, means for severing the end from one of said strips to form a check at each operation of the machine, means for locking said rack-bars during the rotation of said printing-frame, and means for locking said wheels during the rotation of said frame; substantially as set forth.

9. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments, combined with the exposed operating-handle, the rotary printing-frame operable from said handle, the amount-printing wheels carried by said printing-frame and having gear-wheels connected therewith, the sliding rack-bars for setting said printing-wheels upon the movement of said hand-levers, mechanism intermediate said hand-levers and said sliding rack-bars for imparting movement to said bars from said hand-levers, means for disengaging said rack-bars and printing-wheels preparatory to the rotation of the printing-frame, means for locking the parts of the machine against operation when said hand-levers are not moved into line with said numerals, and means for feeding a strip to be printed upon by said wheels during the rotation of the printing-frame; substantially as set forth.

10. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments when the latter are moved by said shaft, combined with the auxiliary driving-shaft, the operating crank-handle connected with said auxiliary driving-shaft, means connecting said auxiliary shaft to said main operating-shaft for imparting to the latter a partial rotary motion from and back to its initial position during the rotation of said auxiliary shaft, the rotary printing-frame geared to said auxiliary shaft and operable therefrom, type-printing wheels carried by said printing-frame, means for locking said auxiliary shaft and printing-frame against movement when said hand-levers are not moved into line with said numerals, and means for feeding a strip to be printed upon by said wheels during the rotation of said printing-frame; substantially as set forth.

11. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments, combined with the exposed operating-handle, the rotary printing-frame operable from said handle, the amount-printing wheels carried by said printing-frame and having gear-wheels connected therewith, the sliding rack-bars for setting said printing-wheels upon the movement of said hand-levers, the series of shafts having gear-wheels at one end in engagement with said sliding rack-bars for moving the latter, gear-wheels at the other end of said shafts, segmental racks carried by said hand-levers for driving said last-mentioned gear-wheels and thereby setting in motion said series of shafts and said rack-bars, and means for feeding a strip to be printed upon by said wheels during the rotation of the printing-frame; substantially as set forth.

12. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments when the latter are moved by said shaft, combined with the auxiliary driving-shaft, the operating crank-handle connected with said auxiliary driving-shaft, means connecting said auxiliary shaft to said main operating-shaft for imparting to the latter a partial rotary motion from and back to its initial position during a rotation of said auxiliary shaft, the rotary printing-frame, the gear-wheel on the shaft thereof, the driving gear-wheel on said auxiliary shaft and in mesh with said first-mentioned gear-wheel for driving said printing-frame from said auxiliary shaft, the type-wheels carried by said frame, the sliding rack-bars for setting said type-wheels upon the movement of said hand-levers, the series of shafts having gear-wheels at one end in engagement with said sliding rack-bars for moving the latter, gear-wheels at the other end of said shafts, segmental racks carried by said hand-levers for driving said last-mentioned gear-wheels and thereby setting in motion said series of shafts and said rack-bars, and means for feeding a strip to be printed upon by said wheels during the rotation of the printing-frame; substantially as set forth.

13. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments when the latter are moved by said shaft, combined with the auxiliary driving-shaft, the operating crank-handle connected with said auxiliary driving-shaft, means connecting said auxiliary shaft to said main operating-shaft for imparting to the latter a partial rotary motion from and back to its initial position during a rotation of said auxiliary shaft, the rotary printing-frame, the gear-wheel on the shaft thereof, the driving gear-wheel on said auxiliary shaft and in mesh with said first-mentioned gear-wheel for driving said printing-frame from said auxiliary shaft, the type-wheels carried by said frame, the sliding rack-bars for setting said type-wheels upon the movement of said hand-levers, the series of shafts having the driving gear-wheels at one end in engagement with said sliding rack-bars for moving the latter, gear-wheels at the other end of said shafts, segmental racks carried by said hand-levers for driving said last-mentioned gear-wheels and said series of shafts, the pivotally-mounted pawl-frame engaging said driving gear-wheels, the pivoted lever pivotally connected with said pawl-frame and having the tooth at its upper end, the pin on said gear-wheel on said auxiliary shaft to be engaged by said tooth when said pawl-frame is held out of its normal position, and means for feeding a strip to be printed upon by said wheels during the rotation of the printing-frame; substantially as set forth.

14. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments, combined with the exposed operating-handle, the rotary printing-frame operable from said handle, the amount-printing wheels carried by said printing-frame, means for automatically setting said printing-wheels from and by the movement of said actuating hand-levers, an additional printing-wheel carried by said frame, an exposed independent lever for manually setting said additional printing-wheel, and means for feeding a strip to be printed upon by said amount-printing wheels and said additional printing-wheel during the rotation of said printing-frame; substantially as set forth.

15. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments, combined with the exposed operating-handle, the rotary printing-frame operable from said handle, the amount-printing wheels carried by said printing-frame, means for automatically setting said printing-wheels from and by the movement of said actuating hand-levers, the two additional independent printing-wheels carried by said frame for denoting respectively the operator and nature of the sale, the exposed independent levers for manually setting said additional printing-wheels, and means for feeding a strip to be printed upon by said amount-printing wheels and said additional printing-wheels during the rotation of said printing-frame; substantially as set forth.

16. In a cash-register, the main operating-shaft, the actuating hand-levers, the front plate having the numerals along which said levers may be moved in accordance with the values to be indicated, the segments whose position is controlled by the movement of said hand-levers, and the registering-wheels to be actuated by said segments, combined with the exposed operating-handle, the rotary printing-frame operable from said handle, the amount-printing wheels carried by said printing-frame, means for automatically setting said printing-wheels from and by the movement of said actuating hand-levers, an additional printing-wheel carried by said frame, an indicating-cylinder bearing data corresponding with the data on said additional printing-wheel, an independent exposed handle connected with said cylinder and wheel for correspondingly setting both thereof, and means for feeding a strip to be printed upon by said amount-printing wheels and said additional printing-wheel during the rotation of said printing-frame; substantially as set forth.

17. In a cash-register, the registering mechanism, and driving mechanism, combined with a rotary printing-frame operable from said driving mechanism, the amount-printing wheels mounted in said frame, means for setting said wheels to correspond with the amount to be registered, an additional printing-wheel carried by said frame, an exposed independent lever for manually setting said additional printing-wheel, and means for feeding a strip to be printed upon by said amount-printing wheels and said additional printing-wheel during the rotation of said printing-frame; substantially as set forth.

18. In a cash-register, the registering mechanism, and driving mechanism, combined with a rotary printing-frame operable from said driving mechanism, the amount-printing wheels mounted in said frame, means for setting said wheels to correspond with the amount to be registered, the two additional independent printing-wheels carried by said frame for denoting respectively the operator and nature of the sale, the exposed independent levers for manually setting said additional printing-wheels, and means for feeding a strip to be printed upon by said amount-printing wheels and said additional printing-wheels during the rotation of said printing-frame; substantially as set forth.

19. In a cash-register, the registering mechanism, and driving mechanism, combined with a rotary printing-frame operable from said driving mechanism, the amount-printing wheels mounted in said frame, means for setting said wheels to correspond with the amount to be registered, an additional printing-wheel carried by said frame, an indicating-cylinder bearing data corresponding with the data on said additional printing-wheel, an independent exposed handle connected with said cylinder and wheel for correspondingly setting both thereof, and means for feeding a strip to be printed upon by said amount-printing wheels and said additional printing-wheel during the rotation of said printing-frame; substantially as set forth.

20. In a cash-register, the registering mechanism, and driving mechanism, combined with a rotary printing-frame operable from said driving mechanism, the amount-printing wheels mounted in said frame, means for setting said wheels to correspond with the amount to be registered, an additional printing-wheel carried by said frame, an indicating-cylinder bearing in duplicate and reverse order data corresponding with the data on said additional printing-wheel, an independent exposed handle connected with said cylinder and wheel for correspondingly setting both thereof, and means for feeding a strip to be printed upon by said amount-printing wheels and said additional printing-wheel during the rotation of said printing-frame; substantially as set forth.

21. In a cash-register, the registering mechanism, and driving mechanism, combined with the rotary printing-frame operable from said driving mechanism, the amount-printing wheels 96 mounted in said frame and having the gear-wheels 103, the manually-operated racks for setting said wheels to correspond with the amount to be registered, the pawl-frame 105 engaging said gear-wheels and having the arm 107 and stud 108 and carried by said printing-frame, the hub 110 on which said stud 108 travels during the rotation of said printing-frame for locking the pawl-frame 105 and the amount-printing wheels 96 against independent movement, and means for feeding a strip to be printed upon by said amount-printing wheels, the said hub 110 having a recess 111 for permitting the adjustment of said amount-printing wheels when the said printing-frame is in its initial position; substantially as set forth.

22. In a cash-register, the registering mechanism, and driving mechanism, combined with the rotary printing-frame operable from said driving mechanism, the amount-printing wheels mounted in said frame, means for setting said wheels to correspond with the amount to be registered, an additional printing-wheel carried by said frame and having a driving gear-wheel, the pivotally-mounted arm 228 carrying the intermediate gear-wheel for engaging said driving gear-wheel to set said additional printing-wheel, the pivotally-mounted segment in engagement with said gear-wheel carried by said lever-arm and having a handle whereby said segment may be manually operated, the cam-plate 230 for controlling the position of said arm 228 and maintaining said gear-wheels separate from each other during the rotation of said printing-frame, and means for feeding a strip to be printed upon by said printing-wheels; substantially as set forth.

23. In a cash-register, the registering mechanism, and driving mechanism, combined with a rotary printing-frame operable from said driving mechanism, the amount-printing wheels mounted in said frame, means for setting said wheels to correspond with the amount to be registered, an additional printing-wheel carried by said frame and having a driving gear-wheel, the pivotally-mounted arm 228 having a gear-wheel to engage the said driving gear-wheel, the indicating-cylinder bearing data corresponding with the data on said additional printing-wheel and having a gear-wheel connected with it, the manually-operable segment in constant mesh with the gear-wheel carried by said arm and also with the gear-wheel connected with said indicating-cylinder, the cam-plate 230 having the pin 244 and recess 231 and connected with said printing-frame to rotate with the same and control the position of said pivoted arm 228, the pivotally-mounted pawl 234 engaging the gear-wheel of said indicating-cylinder, the pivotally-mounted lever 239 having the jointed end or section 242 to engage the said pin 244 when necessary, the pin 238 carried by said lever 239 in position to be engaged by the shank of said pawl 234, and means for feeding a strip to be printed upon by said amount-printing wheels and said additional printing-wheel during the rotation of said printing-frame; substantially as set forth.

24. In a cash-register, the registering mechanism, and driving mechanism, combined with the rotary printing-frame operable from said driving mechanism, the amount-printing wheels mounted in said frame and having the gear-wheels, the series of parallel sliding rack-bars 112 for engaging and rotating said gear-wheels, means for manually operating said rack-bars for setting said amount-printing wheels to correspond with the amount to be registered, the shaft 91 upon which said printing-frame is mounted, the cam-wheel 127 mounted to rotate with said printing-frame and having the recess 128, the pivoted lever 124 at one end engaging said cam 127, the pivoted lever 120 at one end pivotally connected with said lever 124 and at the other end carrying the pin 119 in engagement with all of said rack-bars 112, for freeing the latter from the amount-printing wheels under the action of the cam 127, and means for feeding a strip to be printed upon by said printing-wheels during the rotation of said printing-frame; substantially as set forth.

25. In a cash-register, the registering mechanism, the driving mechanism, and the rotary printing-frame operable from said driving mechanism and comprising the side plates 94, 95, the sets of printing-wheels mounted between said plates, and the gear-wheel 319, one of said plates having the cam projections corresponding with the number of sets of printing-wheels carried by said frame, combined with the frame carrying the impression-roller 304 and feed-roller 303, the gear-wheel 317 on said roller 303, the intermediate gear-wheel 318 in mesh with said gear-wheels 317 and 319, the pivoted lever 311 carrying the feed-roller 300 at one end and at the other end having the spring-pressed pivoted arm 314 in position to be acted upon by said cam projections for pressing the roller 300 at proper periods against the said roller 303 to feed the strip to be printed upon, and means for severing the checks from said strip; substantially as set forth.

26. In a cash-register, the registering mechanism, and driving mechanism, combined with the printing-wheels for printing upon a strip the amounts registered, means for feeding said strip, and means for severing the checks from said strip and comprising the cutter-bar 305, the knife 306, and the hinged rod 307 spring-pressed toward said knife and having the collars 348 to support the check end of said strip; substantially as set forth.

27. In a cash-register, the registering mechanism, and driving mechanism, combined with the printing-wheels for printing upon a strip the amounts registered, means for feeding said strip, and means for severing the checks from said strip and comprising the cutter-bar 305, the pivoted knife 306, the pivoted arms 345, 346, the rod 307 carried by the lower ends of said arms and having the collars 348, the spring 347 drawing said rod 307 toward said knife, the spring 334 normally holding said knife upward from said strip, and means operable from said driving mechanism for depressing said knife against said strip to sever a check therefrom; substantially as set forth.

28. In a cash-register, the registering mechanism, the driving mechanism, and the rotary printing-frame carrying the printing-wheels and having the arm 341, combined with the strip-feeding mechanism, the cutter-bar 305, the pivoted knife 306 for coöperating with said bar in severing the checks from said strip, the pivoted lever 336 for engaging and operating said knife 306, the rod 337 connected with said lever 336 for moving the same, and the pivoted plate 338 to which said arm is pivoted and which has the lip 340 in the path of said arm 341 carried by the printing-frame; substantially as set forth.

29. In a cash-register, the registering mechanism, the driving mechanism, and the rotary printing-frame carrying the printing-wheels and having the arm 293, combined with the tiltable frame carrying the detail-strip rollers and strip and having the yielding toe 283 in the path of said arm 293, the impression-roller carried by said tiltable frame, and means for feeding said strip during the rotation of said printing-frame; substantially as set forth.

30. In a cash-register, the registering mechanism, the driving mechanism, and the rotary printing-frame carrying the printing-wheels and having the arm 293, combined with the tiltable frame carrying the detail-strip rollers and having the yielding toe 283 in the path of said arm 293, the impression-roller carried by said tiltable frame, the ratchet-wheel 265 carried by one of said rollers, the pivoted arm 268 carrying the pin 270 and pawl 267 to engage said ratchet, the pivoted lever 273 at one end engaging said pin 270 for operating said pawl, and means for engaging the other end of said lever 273 during the rotation of the printing-frame for effecting the feeding of said strip; substantially as set forth.

31. In a cash-register, the registering mechanism, the driving mechanism, and the printing mechanism, adapted to print upon a strip, combined with means for effecting the feeding of said strip and including the roller 255 for engaging one end of said strip and comprising the body portion having the groove 260, the split sleeve 258 on said body portion and having the recess 261 and the screw 263 for engaging said body portion and said recess of said sleeve for locking said sleeve and body portion together; substantially as set forth.

Signed at New York, in the county of New York and State of New York, this 5th day of November, A. D. 1902.

HARVEY GILES.

Witnesses:
CHAS. C. GILL,
ARTHUR MARION.